United States Patent
Morrell et al.

(10) Patent No.: US 11,704,741 B1
(45) Date of Patent: *Jul. 18, 2023

(54) SYSTEMS AND METHODS FOR SIMULATING AND VISUALIZING LOSS DATA

(71) Applicant: MagMutual Intermediate Holding Company, Atlanta, GA (US)

(72) Inventors: Neil Morrell, Atlanta, GA (US); Sallie Graves, Atlanta, GA (US)

(73) Assignee: MagMutual Intermediate Holding Company, Atlanta, GA (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/482,270

(22) Filed: Sep. 22, 2021

Related U.S. Application Data

(63) Continuation of application No. 16/566,677, filed on Sep. 10, 2019, now Pat. No. 11,164,260.

(51) Int. Cl.
  *G06Q 40/08* (2012.01)
  *G06Q 40/12* (2023.01)
  *G06Q 10/0635* (2023.01)

(52) U.S. Cl.
  CPC ......... *G06Q 40/08* (2013.01); *G06Q 10/0635* (2013.01); *G06Q 40/125* (2013.12)

(58) Field of Classification Search
  None
  See application file for complete search history.

(56) References Cited

U.S. PATENT DOCUMENTS

| | | |
|---|---|---|
| 6,307,576 B1 | 10/2001 | Rosenfeld |
| 6,611,278 B2 | 8/2003 | Rosenfeld |
| D503,179 S | 3/2005 | Kolawa et al. |
| 7,308,388 B2 | 12/2007 | Beverina |
| D602,027 S | 10/2009 | Queric |
| D602,028 S | 10/2009 | Queric |
| D602,034 S | 10/2009 | Vu et al. |
| D612,861 S | 3/2010 | Lee |
| D664,983 S | 8/2012 | Moreau et al. |
| D667,423 S | 9/2012 | Nagamine |
| D696,680 S | 12/2013 | Bae et al. |
| D697,932 S | 1/2014 | Lee et al. |
| D703,690 S | 4/2014 | MacCubbin et al. |
| D709,517 S | 7/2014 | Meegan et al. |
| D766,268 S | 9/2016 | Katz |

(Continued)

OTHER PUBLICATIONS

US 10,192,005 B2, 01/2019, Yeager et al. (withdrawn)

(Continued)

*Primary Examiner* — Kito R Robinson
(74) *Attorney, Agent, or Firm* — Philip H. Burrus, IV

(57) ABSTRACT

A system (100) includes one or more processors (113), one or more memory devices (114) operable with the one or more processors, and a communication device (1105) in communication with at least one terminal device (102,103, 104,105) having a user interface (112). The one or more processors causing display of a visual simulation (123) in the user interface of one or more loss graphical objects (501) interacting with one or both of an entity type graphical object (601) or one or more loss mitigator graphical objects (602,603,604) as a function of a confidence level defined by a loss probability and a loss magnitude.

20 Claims, 12 Drawing Sheets

(56) References Cited

U.S. PATENT DOCUMENTS

| | | | |
|---|---|---|---|
| D777,181 S | 1/2017 | Hoard et al. | |
| D788,813 S | 6/2017 | Tursi et al. | |
| D791,781 S | 7/2017 | Donarski et al. | |
| D791,815 S | 7/2017 | Dzjind et al. | |
| D797,777 S | 9/2017 | Ochocinski et al. | |
| D807,378 S | 1/2018 | Imamura et al. | |
| D809,531 S | 2/2018 | Ayvazian et al. | |
| 9,978,033 B1 | 5/2018 | Payne et al. | |
| D821,411 S | 6/2018 | McNeil et al. | |
| 10,021,138 B2 | 7/2018 | Gill | |
| 10,121,281 B2 | 11/2018 | Matjasko et al. | |
| 10,127,583 B2 | 11/2018 | Sundaresan et al. | |
| 10,140,386 B2 | 11/2018 | Kagan et al. | |
| 10,180,933 B2 | 1/2019 | Chavoustie et al. | |
| 10,223,760 B2 | 3/2019 | Ananthanpillai et al. | |
| 10,235,027 B2 | 3/2019 | Trauth | |
| 10,248,631 B2 | 4/2019 | Amacker | |
| 10,248,962 B2 | 4/2019 | Mitchell et al. | |
| 10,255,335 B2 | 4/2019 | Ding | |
| 10,262,466 B2 | 4/2019 | Guo et al. | |
| D848,450 S | 5/2019 | Peeten et al. | |
| D849,049 S | 5/2019 | Niven et al. | |
| D849,776 S | 5/2019 | Bassett et al. | |
| 10,282,786 B1 | 5/2019 | Osborne | |
| D851,109 S | 6/2019 | Gualtieri | |
| D872,121 S | 1/2020 | Einspahr et al. | |
| 10,529,028 B1 | 1/2020 | Davis et al. | |
| D902,220 S | 11/2020 | Mitti | |
| D902,229 S | 11/2020 | Chitalia et al. | |
| D910,055 S | 2/2021 | Becker et al. | |
| D910,065 S | 2/2021 | Lim | |
| D910,073 S | 2/2021 | Lim | |
| D910,700 S | 2/2021 | Lim | |
| 11,164,260 B1 | 11/2021 | Morrell | |
| 2001/0027388 A1 | 10/2001 | Beverina et al. | |
| 2003/0158466 A1 | 8/2003 | Lynn | |
| 2005/0065754 A1 | 3/2005 | Schaf et al. | |
| 2006/0106637 A1 | 5/2006 | Johnson | |
| 2011/0050730 A1 | 3/2011 | Ranford | |
| 2012/0150570 A1* | 6/2012 | Samad-Khan | G06Q 40/06 705/4 |
| 2013/0238365 A1 | 9/2013 | Nepomuceno | |
| 2014/0208241 A1 | 7/2014 | Charles et al. | |
| 2014/0365389 A1 | 12/2014 | Cheek et al. | |
| 2015/0052441 A1 | 2/2015 | Degioanni | |
| 2015/0058179 A1 | 2/2015 | Pu et al. | |
| 2015/0170288 A1 | 6/2015 | Harton | |
| 2015/0178850 A1* | 6/2015 | Machnicki | G06Q 40/08 705/4 |
| 2017/0161859 A1 | 6/2017 | Baumgartner et al. | |
| 2018/0089272 A1 | 3/2018 | Bath et al. | |
| 2019/0294719 A1 | 9/2019 | Beringer et al. | |
| 2020/0334638 A1 | 10/2020 | Hu | |

OTHER PUBLICATIONS

Czajkowski, J., Cunha, L. K., Michel-Kerjan, E., & Smith, J. A. (2016). Toward economic flood loss characterization via hazard simulation. Environmental Research Letters, 11(8), 084006 (11 pp.). doi:http://dx.doi.org/10.1088/1748-9326/11/8/084006 on May 1, 2023 (Year: 2016).*

Zischg, A. P., Mosimann, M., Bernet, D. B., & Röthlisberger, V. (2018). Validation of 2D flood models with insurance claims. Journal of Hydrology, 557, 350-61. doi:http://dx.doi.org/10.1016/j.jhydrol.2017.12.042 on May 1, 2023 (Year: 2018).*

Miller, Alan S., "Notice of Allowance", U.S. Appl. No. 16/566,673, filed Sep. 10, 2019; dated Jul. 11, 2022.

"Gamma Distribution—Wikipedia", Viewed online Feb. 5, 2019 at https://en.wikipedia.org/wiki/Gamma_distribution; As published Jan. 20, 2019.

"How normal distribution is different from gamma distribution? In theory and practice?", Published Jun. 2, 2012 at Mathematics Stack Exchange; Viewed online Feb. 5, 2019 at https://math.stackexchange.com/questions/53606/how-normal-distribution-is-different-from-gamma-distribution-in-theory-and-prac,.

"Poisson Distribution", Wikipedia; As published Jan. 13, 2019; Viewed online Feb. 5, 2019 at https://en.wikipedia.org/wiki/Poisson_distribution,.

"Rpois function", RDocumentation; Viewed online Feb. 5, 2019 at https://www.rdocumentation.org/packages/compositions/versions/1.40-2/topics/rpois,.

"The Gamma Distribution", Publication date unknown but prior to Feb. 5, 2019; Viewed online Feb. 5, 2019 at http://astrostatistics.psu.edu/su07/R/html/stats/html/GammaDist.html,.

Holbrow, Katherine, "NonFinal Office Action", U.S. Appl. No. 29/705,230, filed Sep. 10, 2019; dated Jan. 12, 2021.

Holbrow, Katherine, "NonFinal Office Action", U.S. Appl. No. 29/705,233, filed Sep. 10, 2019.

Holbrow, Katherine, "Notice of Allowance", U.S. Appl. No. 29/705,230, filed Sep. 10, 2019; dated Apr. 6, 2021.

Holbrow, Katherine, "Notice of Allowance", U.S. Appl. No. 29/705,233, filed Sep. 10, 2019; dated Apr. 6, 2021.

Holbrow, Katherine, "Notice of Allowance", U.S. Appl. No. 29/705,234, filed Sep. 10, 2019; dated Jan. 13, 2021.

Holbrow, Katherine A., "Notice of Allowance", U.S. Appl. No. 29/705,229, filed Sep. 10, 2019; dated Jan. 13, 2021.

Holbrow, Katherine A., "Notice of Allowance", U.S. Appl. No. 29/705,232, filed Sep. 10, 2019; dated Jan. 13, 2021.

Robinson, Kito, "NonFinal OA", U.S. Appl. No. 16/566,677, filed Sep. 10, 2019; dated Mar. 17, 2021.

Robinson, Kito R., "Notice of Allowance", U.S. Appl. No. 16/566,677, filed Sep. 10, 2019; dated Aug. 5, 2021.

Sugars, E.G, "Selected Results from a Risk-Theoretic Simulation of an Insurance Company", Published 1974; Abstract; Journal of Risk Insurance (Pre-1986), 41(2), 221; Retrieved from https://dialog.progquest.com/prefessional/docview/235099702?accountid=131444 on Jul. 28, 2021.

Miller, Alan S., "NonFinal Office Action", U.S. Appl. No. 16/566,673, filed Sep. 10, 2019; dated Mar. 3, 2022.

* cited by examiner

SYSTEMS AND METHODS FOR SIMULATING AND VISUALIZING LOSS DATA

CROSS REFERENCE TO PRIOR APPLICATIONS

This application is a continuation application claiming priority and benefit under 35 USC § 120 from U.S. patent application Ser. No. 16/566,677, filed Sep. 10, 2019, which is incorporated by reference for all purposes.

BACKGROUND

Technical Field

This disclosure relates generally to systems and methods for the visual representation and presentation of data, and more particularly to the visual representation and animated presentation of loss data as a function of varying confidence intervals.

Background Art

Insurance: its one of those things you don't need very often, but when you need it, you really need it. Said differently, for many people and businesses, losses giving rise to insurance claims are, fortunately, somewhat few and far between. As such, despite carrying one or more insurance policies and dutifully paying premiums, a person or business does not need to rely upon the insurance that often. However, when a loss significant enough to give rise to a claim occurs, it is often the case that being adequately insured is the difference between recovering from the loss and bankruptcy, or worse.

The questions that are all too difficult for many to answer thus become how much insurance to carry, what types of losses to cover, what deductibles are tolerable, what limitations of coverage are acceptable, and so forth. These questions can be difficult to answer for many varied reasons. These reasons include the fact that correlating premium costs to probabilistic loss occurrences is incredibly difficult, the fact that the vast nature of insurance loss data and risk probabilities outweigh the human mind's comprehension, the fact that many individuals and businesses have optimism bias in the sense that they think they will not incur losses, the fact that some individuals and businesses are not educated as to the types of losses that can occur, or other reasons.

Regardless of the reason, existing data simulation and visualization systems fail to provide an adequate visual analysis tool that provides comprehensive visual analysis of cumulative losses. It would be advantageous to have improved systems and methods for simulating and presenting loss data that allowed for a simplified visual analysis by a viewer.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
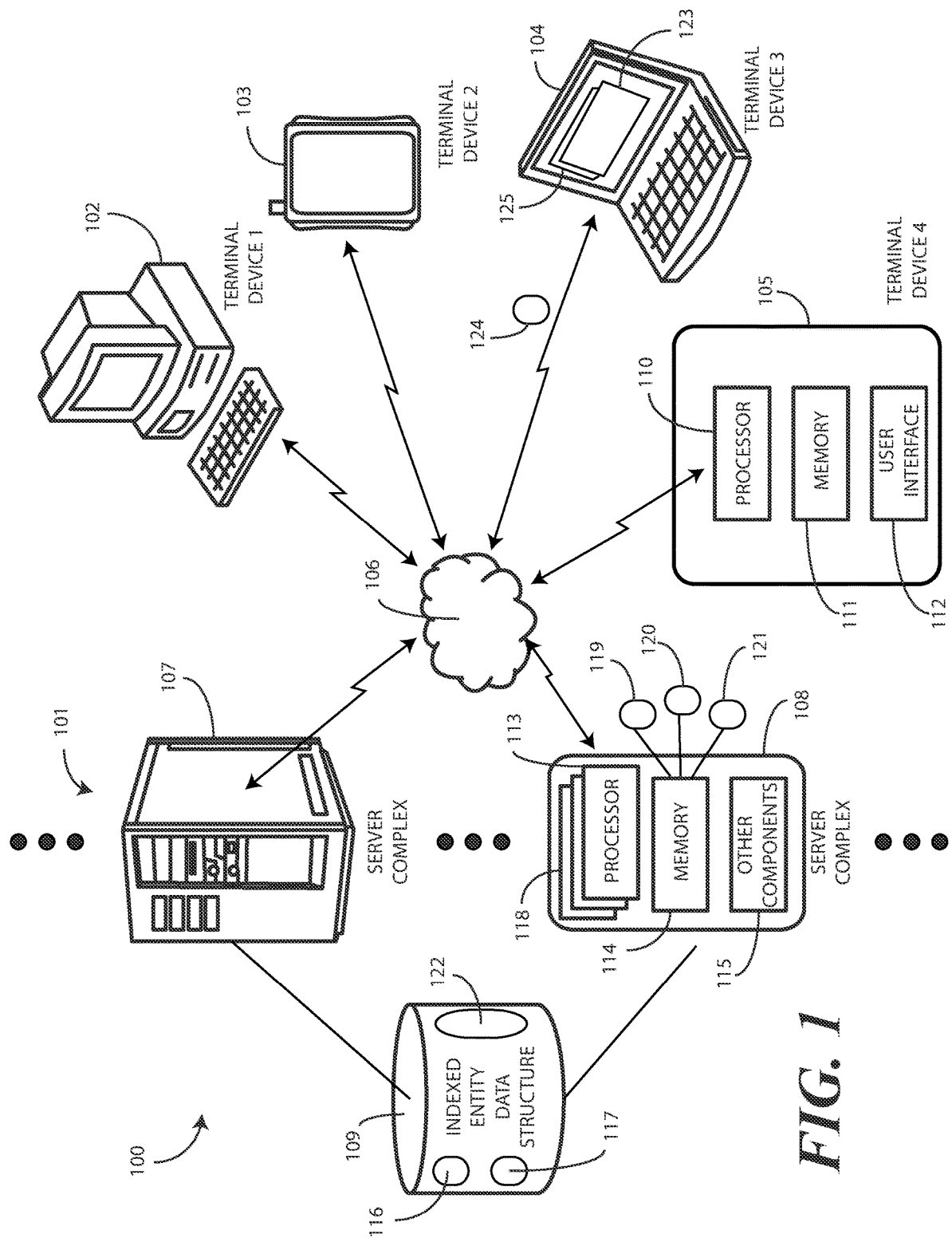
FIG. 1 illustrates a block diagram of one example system for simulating and visualizing loss effects upon an entity in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to the generation, presentation, simulation, and visualization of simulated loss effects upon an entity. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method, nor do they apply a known business process to the particular technological environment of the Internet. Nor do embodiments of the disclosure describe only mathematical concepts, methods of organizing human activity, or mental processes. Moreover, embodiments of the disclosure do not create or alter contractual relations using generic computer functions and conventional network operations.

To the contrary, methods and processes described below create simulations employing a sequence of synchronized, animated graphical objects that allow a user to visualize loss effects upon an entity, which are simulated as occurring as a function of confidence level in one or more embodiments. The simulations also allow the visualization of insurance coverage depletion and entity sustained costs as losses accrue as a function of confidence level. Embodiments of the disclosure allow users to quickly, easily, and simply visualize probabilistic coverage and loss graphical objects to understand the types of losses that they may incur, the frequency of losses that they may incur, the cost of losses that they may incur, and how these statistical data can be changed in when other coverages apply. Heretofore, no known method or system has been capable of accurately conveying all of these aspects into a concise, efficient, loss simulation and visualization tool, particularly in an intuitive sense that is easily understood by an untrained individual.

Embodiments of the disclosure advantageously are able to present complex, probabilistic loss data, not as a function of time, but rather as a function of confidence level, thereby allowing the untrained individual to better understand the tradeoffs of insurance coverages and loss in an intuitive manner. Embodiments of the disclosure advantageously randomize large and uncorrelated loss data points to achieve realistic, but randomized, loss data as a function of entity type. Embodiments of the disclosure can further generate of loss visualization simulations as a function of insurance coverage, loss limits, incident limits, deductible, and claim count. Embodiments of the disclosure can generate loss graphical objects that illustrate size, frequency, and type, as well as a weight with which each loss is encountered, visually expressed at a particular timing as represented by a confidence level rather that chronological time.

It will be appreciated that embodiments of the disclosure described herein may be comprised of one or more conventional processors and unique stored program instructions that control the one or more processors to implement, in conjunction with certain non-processor circuits, some, most, or all of the functions of simulating loss effects upon an entity protected by one or more loss mitigators by generating, presenting, and animating graphical objects representing entity structures and corresponding insurance coverages, as well as randomized, but entity specific, losses as a function of confidence level, as described herein. The non-processor circuits may include, but are not limited to, communication circuits, touch-sensitive displays, user interface technologies such as organic light emitting diode or other display technologies, signal drivers, clock circuits, power source circuits, and user input devices.

As such, these functions may be interpreted as steps of a method to perform the simulation of loss effects upon an entity protected by one or more loss mitigators as a function of a confidence level that, probabilistically, identifies a loss magnitude beyond which no greater loss is probabilistically likely to affect the entity type. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As used herein, words such as "displaying," "animating," "delivering," "generating," "presenting," "accessing," "receiving," "determining," and the like may refer to actions or processes of a machine, such as a computer, that manipulates or transforms data represented as physical quantities, such as tangibly fixed in electronic, magnetic, or optical media, within one or more memory devices, or other machine components that receive, store, transmit, or display information.

As used herein, "confidence level" refers to a probabilistic threshold above which no larger loss will occur. Illustrating by example, if the loss at a ninety-nine percent confidence level is 2.5 million dollars, there is a ninety-nine percent probability that a given entity structure will never experience a loss over 2.5 million dollars for a given data set and distribution of known losses. Where the data set includes all known losses for entity structures similar or the same as the given entity structure, there would be only a one percent chance that the given entity structure ever experiences a loss over 2.5 million dollars, and so forth.

As used herein, directional terms such as "up," "down," "vertical," "horizontal," are intended to refer to the context of the particular simulation or graphical object being described. For example, an entity structure represented as a graphical object may be created and oriented around defined X, Y, and Z-axes. In those examples, the X-Y plane will define horizontal, with up being defined as the positive Z direction and down being defined as the negative Z direction, and so forth.

Embodiments of the disclosure contemplate that visualizing insurance loss events and their financial effects on an individual or business requires methods capable of showing representations of vast amounts of loss data, specific insurance coverage data, and probabilistic thresholds indicative of not at what time a loss will occur, but how likely the loss is to occur. Moreover, embodiments of the disclosure contemplate that it is preferable to be able to demonstrate such complex probabilistic concepts as thresholds such as confidence interval change in a concise and efficient manner. As noted above, no known method is capable of accurately conveying all of these aspects associated with insurance loss and coverage data, particularly in an intuitive sense that is easily understood by an untrained individual.

Advantageously, embodiments of the disclosure provide a computer-implemented method for simulating loss effects upon an entity protected by one or more loss mitigators that is intuitive and easy to understand, even by the untrained individual. In one or more embodiments, the computer-implemented method includes displaying, with one or more processors in a user interface an entity graphical object, one or more loss graphical objects, and one or more loss mitigator graphical objects. In one or more embodiments, each loss graphical object has a loss magnitude associated therewith. In one or more embodiments, simulating the loss effects upon the entity protected by the one or more loss mitigators then commences by animating, with the one or more processors in the user interface, the one or more loss graphical objects as a first simulation. In one or more embodiments, the first simulation causes the one or more loss graphical objects to visually interact with one or both of the entity graphical object or the one or more loss mitigator graphical objects in the user interface. In one or more embodiments, this interaction occurs not as a function of time, but as a function of a confidence level.

In one or more embodiments, the loss mitigators of the first simulation are defined by insurance coverage that protects the entity defining the entity type. Accordingly, a person can see in the first simulation the financial losses that accrue as a function of confidence level across the world of losses their entity type is likely to experience.

To provide feedback as to how this loss exposure can be further mitigated, in one or more embodiments a second simulation then occurs. Illustrating by example, in one or more embodiments the one or more processors can receive, via the user interface, one or more inputs defining changes to the one or more loss mitigator objects. For instance, an entity that previously had only professional liability coverage and business owner's coverage may elect to add cyber security coverage or an umbrella policy. Alternatively, or in combination, the entity may choose to adjust deductibles, aggregate coverage, per claim coverage, or another component of the loss mitigators.

Thereafter, in one or more embodiments the second simulation of loss effects upon the entity, when protected by the modified loss mitigators, can proceed. In one or more embodiments, the one or more processors again display, in the user interface, the entity object and the one or more loss graphical objects, which may be the same set from the first simulation or a different set. The one or more processors then display the one or more alternate loss mitigator graphical objects. In one or more embodiments, the alternate loss mitigator graphical objects visually represent the received changes defined by the one or more inputs received from the user interface.

The one or more processors can then simulate the loss effects upon the entity protected by the one or more alternate loss mitigators by animating, with the one or more processors in the user interface, the one or more loss graphical objects as a second simulation. In one or more embodiments, the second simulation causes the one or more loss graphical objects to visually interact with one or both of the entity graphical object or the one or more alternate loss mitigator graphical objects in the user interface. In one or more embodiments, this interaction also occurs not as a function of time, but as a function of a confidence level.

To conveniently illustrate the differences between the first simulation and the second simulation, in one or more embodiments the one or more processors can display results of the first simulation and the second simulation simultaneously in the user interface. This can include displaying the cumulative losses incurred by the entity, those absorbed by the loss mitigators, the one or more loss mitigator graphical objects, the one or more alternate loss mitigator graphical objects, and/or other results of the first simulation and the second simulation. In one or more embodiments, the results of the first simulation and the second simulation each simulate a set of financial losses that can occur to the entity represented by the entity graphical object. Other results will be obvious to those of ordinary skill in the art having the benefit of this disclosure.

Turning now to FIG. 1, illustrated therein is one explanatory system 100 for simulating loss effects upon an entity protected by one or more loss mitigators. In the illustrative embodiment of FIG. 1, the system 100 comprises one or more terminal devices 102,103,104,105 that are communicatively coupled to a server complex 101 across a network 106. Examples of network 106 include wide area networks, local area networks, mobile networks, private networks, personal area networks, wired networks, peer-to-peer networks, wireless networks, and so forth. Other examples of network 106 will be obvious to those of ordinary skill in the art having the benefit of this disclosure.

In one or more embodiments, the system 100 is implemented across the Internet. In one or more embodiments, the server complex 101 is hosted in the "cloud." Where so configured, the server complex 101 may be referred to as one or more cloud computing nodes, while the terminal devices 102,103,104,105 may be referred to as cloud client devices, and so forth.

The terminal devices 102,103,104,105 can take any number of a variety of forms. In the illustrative embodiment of FIG. 1, terminal device 102 is a desktop computer. Terminal device 103 is a smartphone. Terminal device 103 is a laptop computer. Terminal device 104 is a tablet computer. However, it will be obvious to those of ordinary skill in the art having the benefit of this disclosure that the terminal devices 102,103,104,105 may include other types of devices as well, including portable or non-portable electronic devices capable of wired or wireless communications and execution of software and firmware, and which include a user interface configured to receive input and a display capable of presenting content and graphical objects to a user.

In the illustrative embodiment of FIG. 1, each of the one or more terminal devices 102,103,104,105 includes one or more processors 110, a memory 111, and one or more user interfaces 112. Examples of user interfaces 112 include keyboards, touch-sensitive displays, touch-sensitive surfaces, displays, or other devices that present information to a user and/or receive user input in the form of data signals.

In one or more embodiments, the server complex 101 comprises one or more servers 107,108. While frequently referred to herein as "terminal" devices, it should be noted that the terminal devices 102,103,104,105 may also be referred to as "client" electronic devices or as "clients" with respect to a server 107,108 of the server complex 101. It should also be noted that the illustrative simulation system of FIG. 1 may include more or fewer servers 107,108 and terminal devices 102,103,104,105, as well as other devices not shown.

The one or more servers 107,108 may employ distributed processing. In the illustrative embodiment of FIG. 1, the one or more servers 107,108 can include one or more processors 113, one or more memory devices 114, and one or more other components 115. The other components 115 can include communication devices facilitating electronic signal and data communication with other data processing systems or devices, such as the one or more terminal devices 102,103,104,105, one or more user interface deices, or other devices.

Program code, modules, and computer-readable instructions for the one or more processors 113 may be located in the one or more memory devices 114. The one or more processors 113 may execute and perform processes of the different embodiments of the methods described below using computer-implemented instructions, which may be stored the one or more memory devices 114. In other embodiments, the program code, modules, and computer-readable instructions can be downloaded from the indexed entity data structure 109 or another server for use by the one or more processors 113 of the one or more servers 107,108.

In one or more embodiments, the one or more servers 107,108 are operable with an indexed entity data structure 109. The indexed entity data structure 109 may be directly coupled to the server complex 101 in one or more embodiments. In other embodiments, the indexed entity data structure may instead be accessible by the one or more servers 107,108 across the network 106.

In one or more embodiments, the indexed entity data structure 109 can be configured as a content storage device. Examples of such content storage devices include one or more memory devices, disk arrays, or solid-state memory devices. These devices may be configured as a just a bunch of memories, as a redundant array of inexpensive disks, or in other architectures.

In one or more embodiments, data and program code can be stored in the one or more servers 107,108, in the one or more terminal devices 102,103,104,105, and/or in the indexed entity data structure 109. Data and program code can be stored in a persistent storage component, such as a computer recordable storage medium, of the indexed entity data structure 109 in one or more embodiments. Where so stored one or more of the servers 107,108 and/or the terminal devices 102,103,104,105 can download data and/or program code for use.

Illustrating by example, in one or more embodiments, loss data, entity structures, insurance coverage, and corresponding program code may be stored in the indexed entity data structure 109 and downloaded to the one or more servers 107,108 for use. The one or more servers 107,108 may then perform operations such as generating entity structure and insurance coverage models as graphical objects, generating loss models as graphical objects, and causing the two to interact in an animated fashion as a function of a confidence interval to demonstrate loss susceptibility and monetary risk via graphical object animation.

While the indexed entity data structure 109 is illustrated as a single component serving multiple servers 107,108 in FIG. 1, it should be noted that the indexed entity data structure 109 could be configured in a distributed architecture in other embodiments, with one or more indexed entity data structure storage devices serving each server 107,108 as well. Other configurations for the indexed entity data structure 109 will be obvious to those of ordinary skill in the art having the benefit of this disclosure.

The indexed entity data structure 109 may store a variety of simulation data. Examples of such data include entity type identification data 116, loss data 117, and loss mitigator data 122.

In one or more embodiments, the entity type identification data 116 identifies entities by one or more predefined class codes. The entity type identification data 116 can identify other information about an entity as well.

Illustrating by example, if the entity is a medical practice, the entity type identification data 116 may indicate the state in which the medical practice is located, the number of physicians, their specialty type, the number of procedures performed by the practice, the number of beds used by the practice, the number of outpatient visits received by the practice, and so forth. Other examples of entity type identification data 116 will be obvious to those of ordinary skill in the art having the benefit of this disclosure.

The loss data 117 can be obtained from a variety of sources. Examples of such sources include private sources and public sources. Using a medical practice as an illustrative example of an entity, in one or more embodiments the loss data 117 can comprise loss data from professional liability claims made against the medical practice. Such loss data 117 can be obtained from insurance companies, reinsurance companies, and other entities. In other embodiments, the loss data 117 can comprise public loss data. Continuing with the medical practice example, sources for such public loss data can include data from service providers such as Definitive Health Care.sup.™, Iqvia.sup.™, the National Practitioner Data Bank.sup.™ (NPDB), the Florida Claims Data Submission database, or other sources. Other examples of loss data 117 will be obvious to those of ordinary skill in the art having the benefit of this disclosure.

In one or more embodiments, the one or more processors 113 can define one or more process engines 118 used in a simulation system. The process engines 118 can perform portions of a method of generating entity type graphical objects from the entity type identification data 116, loss mitigator graphical objects from the loss mitigator data 122, and loss graphical objects from the loss data 117 for the system 100.

Illustrating by example, a sample selection engine of the one or more processors 113 can select a sample set of loss data 117 from indexed entity data structure 109. To ensure that the sample selection engine selects losses from the loss data 117 randomly, a sample rule set application engine can be included to work in conjunction with the sample selection engine.

In one or more embodiments, the sample rule set application engine applies one or more rules by which the sample rule set application engine must comply when selecting losses from the loss data 117. These rules ensure that the losses selected from the loss data 117 are realistic in that they vary from time period to time period, in number, severity, and frequency, while at the same time ensuring that a desired frequency is the mean across the plurality of time periods. Thus, in one or more embodiments the sample rule set application engine applies rules that cause the sample selection engine to sample the loss data 117 in a way that generates randomized loss data 119.

As noted above, one of the principal advantages of embodiments of the disclosure is that the randomized loss data 119 is presented not as a function of time, but rather as a function of confidence level. To achieve this, in one or more embodiments a confidence level data conversion engine of the one or more processors 113 is responsible for converting the randomized loss data 119 into a visualization loss data set 120.

The confidence level data conversion system performs this process, in one or more embodiments, by sorting losses from the randomized loss data 119 from least severity to highest severity to generate a sorted randomized loss data set 121. Next, the confidence level data conversion engine divides this sorted randomized loss data set 121 into a predefined number of groups, such as one hundred. Thereafter, the confidence level data conversion engine selects, evenly from the predefined number of groups, a predefined number of losses from the sorted randomized loss data set 121 that will be used for the simulation. Since this visualization loss data set 120 is arranged in the predefined number of groups by magnitude, and since the visualization loss data set 120 represents a sampling of losses taken from a very long period of time, e.g., one thousand years in one or more embodiments, each of the one hundred groups defines a confidence level below which no loss with a greater magnitude will occur.

A sample presentation visualization data generation engine of the one or more processors 113 can then correlate the visualization loss data set 120 to a given entity structure identified by the entity type identification data 116. The sample presentation visualization data generation engine can also generate loss graphical objects from the visualization loss data set 120 by applying one or more modeling rules stored in the indexed entity data structure 109 or another memory or storage device.

An entity visualization renderer engine can generate an entity type graphical object from the entity type identification data 116 for the system 100. Once the sample presentation visualization data generation engine generates loss graphical objects from the visualization loss data set 120, and the entity visualization renderer generates an entity type graphical object from the entity type identification data 116 and/or one or more loss mitigator graphical objects for the system 100, an animation rule application engine then applies one or more animation rules to generate a visualization comprising the loss graphical objects, the entity type graphical object, and/or the one or more loss mitigator graphical objects.

In one or more embodiments, as will be shown in more detail below with reference to FIG. 5, the animation rule application engine applies one or more animation rules to generate a simulation by initially causing only the loss graphical objects to be presented in the simulation. In one or more embodiments, as will be shown below in more detail with reference to FIG. 6, the animation rule application engine then applies another animation rule in generating the simulation by introducing the entity type graphical object and/or the one or more loss mitigator graphical objects. In one or more embodiments, the animation rule application engine then applies another animation rule causing the loss graphical objects to be introduced in an animated fashion about and encircling the entity type graphical object and/or the one or more loss mitigator graphical objects.

In one or more embodiments, the animation then proceeds like a temporal video. However, events in the animation do not occur as a function of time. They instead occur as a function of confidence level.

In one or more embodiments, as will be shown below in more detail with reference to FIG. 7, the animation rule application engine then applies another animation rule causing the loss graphical objects to have metadata associated therewith. Advantageously, the inclusion of this metadata allows a user to perform a terminal device interaction event interacting with the controls of the animation to pause the animation and interact with a loss graphical object. In one or more embodiments, doing so reveals a graphical presentation of the description of the loss graphical object, e.g., the type of loss, the severity type, the magnitude of the loss, the probability of the loss occurring, and other information.

The one or more processors 113 of the one or more servers 107,108 may execute instructions stored in the memory devices 114 of the one or more servers 107,108 to perform one or more simulations of loss effects upon an entity protected by one or more loss mitigators. In one or more embodiments, the one or more processors 113 of the one or more servers 107,108 may display, in the user interface 112 of one of the terminal devices 102,103,104,105, an entity graphical object and one or more loss mitigator graphical objects.

In one or more embodiments, the entity type graphical object comprises a cylinder representing the entity structure. In one or more embodiments, the cylinder representing the entity structure has a predefined color, one example of which is white. In one or more embodiments, the cylinder has a predefined height that is configured to be greater than the largest loss mitigator. Thus, if the largest loss mitigator has a loss mitigation magnitude of 2.5 million dollars, represented by the height of the corresponding loss mitigator graphical object, in one or more embodiments the cylinder representing the entity structure will have a height greater than this magnitude. While a white cylinder is one geometric object suitable for representing the entity structure as an entity type graphical object, numerous others will be obvious to those of ordinary skill in the art having the benefit of this disclosure.

As with the entity type graphical object, the loss mitigator graphical objects can be represented as geometric objects. In one or more embodiments, the loss mitigator object is attached to the entity type graphical object. Illustrating by example, in one or more embodiments the loss mitigator graphical objects comprise wedges attached to a major face of the entity type graphical object. While a wedge is one possible geometric configuration for the loss mitigator graphical objects, others will be obvious to those of ordinary skill in the art having the benefit of this disclosure. For instance, the loss mitigator graphical objects can each comprise a bar attached to a major face of the entity type graphical object, a concentrically aligned layer circumscribing the entity type graphical object, and so forth.

In one or more embodiments, the loss mitigator graphical objects can have a certain color corresponding to the type of loss mitigated. If, for example, the loss mitigator graphical objet represents an insurance policy protecting the entity type graphical object, a loss mitigator graphical object representing medical professional liability may be a first color, while another loss mitigator graphical object representing business owner's liability may be a second color. A worker's compensation loss mitigator graphical object may be a third color, while a healthcare services liability loss mitigator graphical object may be a fourth color. An excess liability loss mitigator graphical object may be a fifth color, while a miscellaneous liability loss mitigator graphical object may be a sixth color. A general commercial liability loss mitigator graphical object may be a seventh color, while a directors and officer's errors and omissions liability loss mitigator graphical object may be an eighth color.

An employment practices liability loss mitigator graphical object may be a ninth color, while a fiduciary liability loss mitigator graphical object may be a tenth color. A fiduciary liability loss mitigator graphical object may be an eleventh color, while a cyber liability loss mitigator graphical object is a twelfth color and a regulatory liability loss mitigator graphical object is a thirteenth color, and so forth. These are illustrative examples only, as loss mitigator graphical objects may share colors in other embodiments. Of course, various combinations of colors could be used as well, with some loss mitigator graphical objects sharing a color while others are colored differently. Other configurations for the loss mitigator graphical objects will be obvious to those of ordinary skill in the art having the benefit of this disclosure.

The loss mitigator graphical objects can have a predefined height. In one or more embodiments, the predefined height is a magnitude of mitigation the loss mitigator graphical object can provide for any one single loss. If the loss mitigator graphical objects represent insurance policies, the magnitude of mitigation the loss mitigator graphical object can provide for any one single loss may be the occurrence limit of the policy, for example. Other examples of magnitudes of mitigation the loss mitigator graphical object can provide for any one single loss will be obvious to those of ordinary skill in the art having the benefit of this disclosure.

The loss mitigator graphical objects can have a predefined depth. In one or more embodiments, the predefined depth is a magnitude of mitigation the loss mitigator graphical object can provide prior to depletion. If the loss mitigator graphical object represents an insurance policy, the magnitude of mitigation the loss mitigator graphical object can provide for any one single loss might be the aggregate limit of the policy, for example. Other examples of magnitudes of mitigation the loss mitigator graphical object can provide prior to depletion will be obvious to those of ordinary skill in the art having the benefit of this disclosure.

The loss mitigator graphical object can have a predefined gap between a base of the entity type graphical object and the base of one or more of the loss mitigator graphical object. In one or more embodiments, this predefined gap represents a threshold below which the loss mitigator graphical object will be ineffective. If the loss mitigator graphical object represents an insurance policy, in one or more embodiments the threshold below which the loss mitigator graphical object will be ineffective may be the deductible, for example. Other examples of thresholds below which the loss mitigator graphical object will be ineffective will be obvious to those of ordinary skill in the art having the benefit of this disclosure.

The one or more processors 113 of the one or more servers 107,108 may continue to perform a simulation 123 of loss effects upon an entity protected by one or more loss mitigators by displaying, in the user interface 112 of one of the terminal devices 102,103,104,105, one or more loss graphical objects. In one or more embodiments, each loss graphical object has at least a loss magnitude associated therewith.

In one illustrative embodiment each loss graphical object has a visual appearance resembling a microbe or germ. In one or more embodiments, this menacing appearance serves as a visual cue that loss represented by the loss graphical objects have an adverse or deleterious effect on entity structure graphical objects and/or loss mitigator graphical objects.

In one or more embodiments, each loss graphical object has a predefined color. In one or more embodiments, the predefined color corresponds to the type of loss.

In one or more embodiments, each loss graphical object has a predefined size. In one or more embodiments, the predefined size corresponds to the magnitude of loss.

In one or more embodiments, each loss graphical object has a predefined opacity. In one or more embodiments, the predefined opacity corresponds to the probability that another loss having a predefined magnitude will occur. Illustrating by example, if a loss graphical object has a reoccurrence probability of ninety-five percent, in one or more embodiments this loss graphical object will be represented by a graphical object having a first opacity, such as opacity of five percent. By contrast, if another loss graphical object has a reoccurrence probability of only ten percent, in one or more embodiments that loss graphical object will be represented as having a second opacity, greater than the first opacity, such as such as an opacity of ninety percent, and so forth.

The one or more processors 113 of the one or more servers 107,108 may continue to perform a simulation 123 of loss effects upon an entity protected by one or more loss mitigators by animating, in the user interface 112 of one of the terminal devices 102,103,104,105, the one or more loss graphical objects as a first simulation. In one or more embodiments, the first simulation causes the one or more loss graphical objects to visually interact with one or both of the entity graphical object or the one or more loss mitigator graphical objects in the user interface 112.

In one or more embodiments, this interaction takes the form of a crashing impact, where the loss graphical objects crash into one or both of the entity graphical object and/or the one or more loss mitigator graphical objects in the user interface 112. In one or more embodiments, the loss graphical objects visually appear to explode when they crash into one or both of the entity graphical object and/or the one or more loss mitigator graphical objects in the user interface 112.

In one or more embodiments, this interaction of the loss graphical objects with the entity graphical object and/or the one or more loss mitigator graphical objects occurs as a function of confidence level. As noted above, the confidence level defines a probabilistic threshold that the loss magnitude of all subsequent loss graphical objects interacting with one or both of the entity graphical object or the one or more loss mitigator graphical objects will be below a predefined loss magnitude threshold. Thus, if the confidence level is at ninety percent, and the largest loss magnitude associated with a loss graphical object having interacted with one or both of the entity graphical object or the one or more loss mitigator graphical objects is 1.5 million dollars, there is a ninety percent probability that no loss greater than 1.5 million dollars will interact with one or both of the entity graphical object or the one or more loss mitigator graphical objects.

In one or more embodiments, to indicate where the confidence level presently is in the simulation 123, the one or more processors 113 of the one or more servers 107,108 may display, in the user interface 112, a confidence level meter. In one or more embodiments, the confidence level meter identifies that the confidence level is increasing as the animation of the simulation 123 progresses.

In one or more embodiments, the one or more processors 113 of the one or more servers 107,108 may cease the animation of the simulation 123 when the confidence level meter indicates that the confidence level has met or exceeds a predefined threshold. For example, in one or more embodiments the one or more processors 113 of the one or more servers 107,108 terminate the animation of the simulation 123 when the confidence level meter indicates that the confidence level has reached 99.9 percent. Other thresholds will be obvious to those of ordinary skill in the art having the benefit of this disclosure.

In one or more embodiments, after completing the simulation 123, the one or more processors 113 of the one or more servers 107,108 may receive, from the user interface 112 of one of the terminal devices 102,103,104,105, one or more inputs 124 defining or requesting changes to the one or more loss mitigator graphical objects used in the simulation 123. For example, if the loss mitigator graphical objects represent insurance coverage, the one or more inputs 124 may request increases in coverage per claim, total coverage, increases or decreases in deductible, and so forth. If the one or more loss mitigator graphical objects used in the simulation 123 represented only medical professional liability insurance, business owner's liability insurance, and worker's compensation insurance, the one or more inputs 124 may request additional coverage, such as adding a general commercial liability policy and a cyber liability policy, and so forth.

Thereafter, the entity visualization renderer engine can modify, or generate new, loss mitigator graphical objects for the system 100 in response to the one or more inputs 124. The one or more processors 113 of the one or more servers 107,108 may then perform a second simulation 125 of loss effects upon an entity protected by one or more loss mitigators by again displaying, in the user interface 112, the entity graphical object and the alternate (e.g., modified or new) loss mitigator graphical objects, where those alternate loss mitigator graphical objects visually represent the changes received in the one or more inputs 124.

The one or more processors 113 of the one or more servers 107,108 may also display, in the user interface 112, the one or more loss graphical objects. These loss graphical objects can be the same as from the simulation 123 in one or more embodiments. In other embodiments, a new set of loss graphical objects can be created as described above.

The one or more processors 113 of the one or more servers 107,108 may then continue to perform the second simulation 125 of loss effects upon an entity protected by animating, in the user interface 112, the one or more loss graphical objects of the second simulation 125, thereby causing the one or more loss graphical objects to visually interact with one or both of the entity graphical object or the one or more alternate loss mitigator graphical objects in the user interface 112. As noted above, in one or more embodiments this interaction occurs as a function of the confidence level. As before, the second simulation 125 can proceed until a predefined confidence level is reached or exceeded, such as 99.9 percent. By viewing the second simulation 125, the viewer can see how the losses sustained by the entity increase, or decrease, as a result of the changes requested in the one or more inputs 124.

To make these differences between the simulation 123 and the second simulation 125 more clear, in one or more embodiments the one or more processors 113 of the one or more servers 107,108 may, after the second simulation 125, display results of the simulation 123 and the second simulation 125 simultaneously in the user interface. Concurrently with these results, in one or more embodiments the one or more processors 113 of the one or more servers 107,108 may also display both the one or more loss mitigator graphical objects and the one or more alternate loss mitigator graphical objects as well. In one or more embodiments, the results presented here simulate a set of financial losses that can occur to the entity, as represented by the entity graphical model, in response to gaps or limits in the protection offered by the one or more loss mitigator graphical objects or the one or more alternate loss mitigator graphical objects.

In some embodiments, the one or more processors 110 of one of the terminal devices 102,103,104,105 may be configured to carry out simulations without communication with the one or more processors 113 of the one or more servers 107,108. In this case, the one or more processors 110 of a terminal device 102,103,104,105 may execute instructions stored in the memory 111 to access the data shown stored in the indexed entity data structure 109 in FIG. 1, but which may be stored locally in the memory 111 of the terminal device 102,103,104,105.

It should be noted that FIG. 1 is show for explanatory purposes. It is not intended to illustrate the only computer network upon which the various components and modules of the system 100, as well as the corresponding methods, can be implemented. To the contrary, numerous other system architectures will be obvious to those of ordinary skill in the art having the benefit of this disclosure. For example, rather than being implemented upon the distributed data processing system of FIG. 1, in other embodiments the various components and modules of the system 100, as well as the corresponding methods, can be implemented in a stand-alone computer, palm top computer, laptop computer, or mobile communication device, as noted above.

Figure 2:
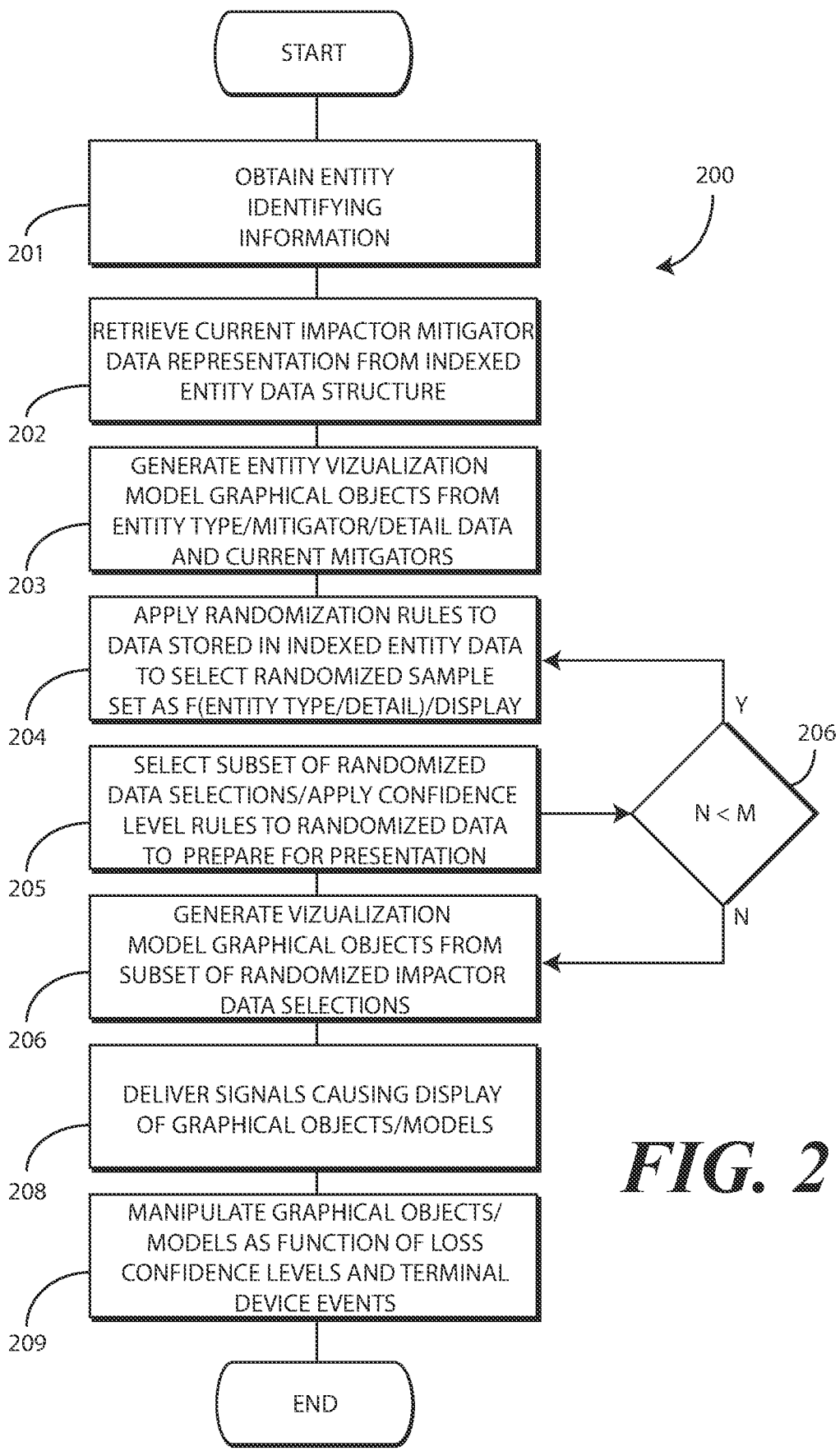
FIG. 2 illustrates one explanatory method for simulating and visualizing loss effects upon an entity in accordance with one or more embodiments of the disclosure.

Turning now to FIG. 2, illustrated therein is one explanatory method 200 for simulating loss effects upon an entity protected by one or more loss mitigators in accordance with one or more embodiments of the disclosure. Beginning at step 201, the method 200 obtains entity identifying information.

In one or more embodiments, step 201 comprises obtaining the entity identifying information from an indexed entity data structure. In other embodiments, step 201 comprises receiving entity-defining information in the form of one or more inputs received from a terminal device. Of course, a combination of retrieval and receipt can be used as well. In one or more embodiments, this information is used to generate an entity type graphical object.

One example of entity identifying information obtained at step 201 is entity type. For example, using medical service providers, the entity type might be a hospital, a hospital/provider, a facility, a facility/provider, a provider group, or a solo physician. Other examples of entity types will be obvious to those of ordinary skill in the art having the benefit of this disclosure.

Other examples of entity identifying information obtained at step 201 include the state in which the entity is located and the county in which the entity is located. If the entity is a medical practice, the entity identifying information can include the number of procedures performed by the entity, the number of outpatient visits occurring at the entity, the number of beds at the entity, the number of procedures performed by the entity, the number of outpatient visits occurring at the entity, and so forth. Other types of information that can be obtained at step 201 include operational information related to the entity, internal component information of the entity, the number of operations of the entity, the frequency of operations of the entity, and so forth. Other examples of entity identifying information will be obvious to those of ordinary skill in the art having the benefit of this disclosure.

At step 202, the method 200 obtains loss mitigator information. In one or more embodiments, this information is used to generate a loss mitigator graphical object. In one or more embodiments, step 202 comprises obtaining the loss mitigator information from an indexed entity data structure. In other embodiments, step 201 comprises loss mitigator information in the form of one or more inputs received from a terminal device. Of course, a combination of retrieval and receipt can be used as well.

In one or more embodiments, the loss mitigators are insurance policies. Where so, the loss mitigator information can comprise information such as type of loss the loss mitigator mitigates, the magnitude of mitigation the loss mitigator can provide for any one single loss, the magnitude of mitigation the loss mitigator can provide prior to depletion, and/or the threshold below which the loss mitigator will be ineffective can all be easily expressed. In one or more embodiments, these data can be policy type, limited indemnity, aggregate protection, and deductible, respectively.

While an insurance policy is one illustrative example of a loss mitigator, it will be obvious to those of ordinary skill in the art having the benefit of this disclosure that loss mitigators can take other forms as well. Using a house as an example entity, a loss mitigator may comprise a coat of paint, a roof, or insulation, each mitigating the impact of weather, pest, and other losses. If the entity is an organism, a loss mitigator might be a vaccine, mitigating the impact of a disease. If the entity is a vehicle, the loss mitigator might be engine oil mitigating against friction, heat, and mechanical wear. Other examples of loss mitigators will be obvious to those of ordinary skill in the art having the benefit of this disclosure.

Figure 6:
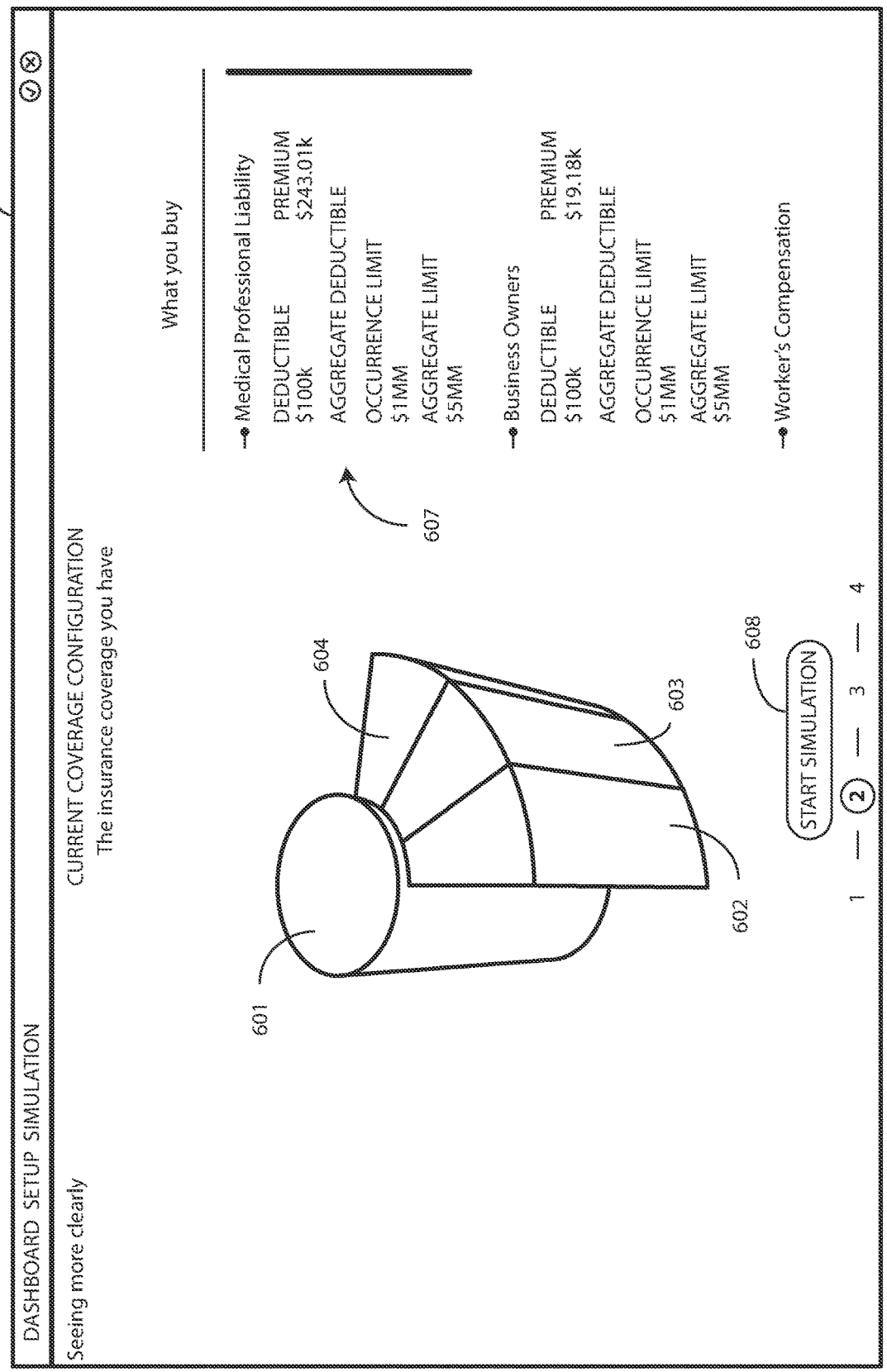
FIG. 6 illustrates another screen shot of one explanatory simulation and visualization system in accordance with one or more embodiments of the disclosure.

At step 203, the method 200 generates an entity type graphical object and one or more loss mitigator graphical objects from the information obtained at steps 201,202. Turning briefly to FIG. 6, illustrated therein is one explanatory entity type graphical object 601 and one or more loss mitigator graphical objects 602,603,604. Each of the entity type graphical object 601 and one or more loss mitigator graphical objects 602,603,604 shown in FIG. 6 comprises a graphical object suitable for presentation at a user interface of a terminal device in one or more embodiments.

In the illustrative example of FIG. 6, the entity type graphical object 601 is rendered as a geometric graphical object. In this example, the geometric graphical object comprises a cylinder. While a cylinder is one geometric object suitable for representing the entity type graphical object 601, it is illustrative only. Numerous others will be obvious to those of ordinary skill in the art having the benefit of this disclosure, as noted above.

In one or more embodiments, the cylinder has a predefined color. In one or more embodiments, the cylinder has a predefined height. In one or more embodiments, the predefined height is greater than a corresponding height of largest loss mitigator graphical objects 602,603,604.

The loss mitigator graphical objects 602,603,604 of the illustrative embodiment of FIG. 6 are represented as geometric objects attached to the entity type graphical object 601. In the illustrative embodiment of FIG. 6, the loss mitigator graphical objects 602,603,604 each comprise a wedge attached to a major face of the entity type graphical object 601. While a wedge is one possible geometric configuration for the loss mitigator graphical objects 602,603, 604, other examples of shapes for the loss mitigator graphical objects 602,603,604 will be obvious to those of ordinary skill in the art having the benefit of this disclosure.

In one or more embodiments, the loss mitigator graphical objects 602,603,604 have a certain color corresponding to the type of loss each mitigates. In one or more embodiments, the loss mitigator graphical objects 602,603,604 have a predefined height representing a magnitude of mitigation the loss mitigator can provide for any one single loss. In one or more embodiments, the loss mitigator graphical objects 602,603,604 have a predefined depth representing a magnitude of mitigation the loss mitigator can provide prior to depletion.

In one or more embodiments, the loss mitigator graphical objects 602,603,604 have a predefined gap between a base 605 of the entity type graphical object 601 and the base 606 of one or more of the loss mitigator graphical objects 602,603,604. In one or more embodiments, this predefined gap represents a threshold below which the loss mitigator will be ineffective, such as the deductible of an insurance policy.

Figure 8:
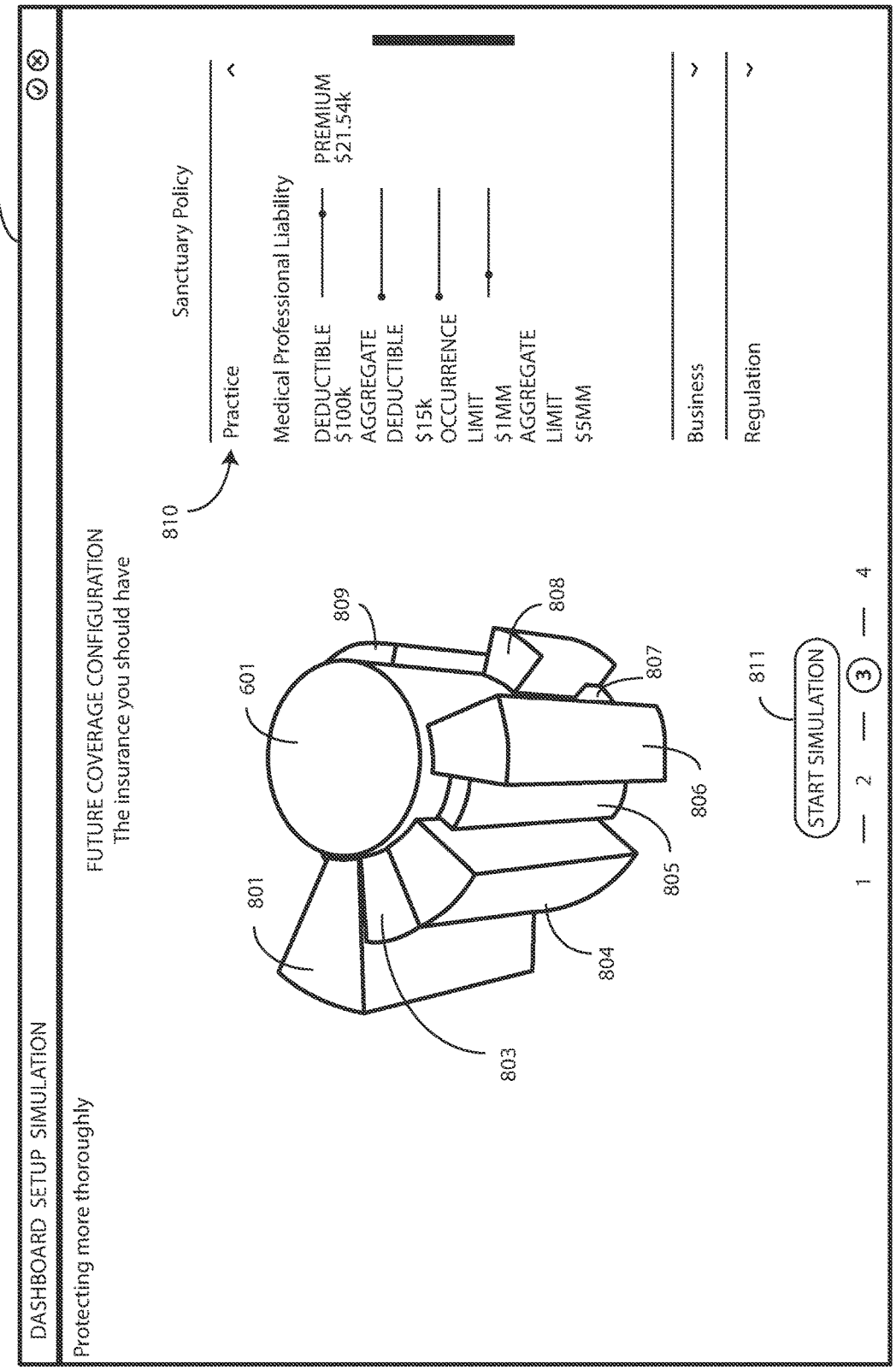
FIG. 8 illustrates yet another screen shot of one explanatory simulation and visualization system in accordance with one or more embodiments of the disclosure.

Turning briefly to FIG. 8, illustrated therein is another entity type graphical object 601 shown with one or more loss mitigator graphical objects 801,803,804,805,806,807,808, 809. Each of the entity type graphical object 601 and one or more loss mitigator graphical objects 801,803,804,805,806, 807,808,809 shown in FIG. 8 comprises a graphical object suitable for presentation on an output of a terminal device in one or more embodiments. Features such as the geometric graphical object of the entity type graphical object 601, the predefined height of the entity type graphical object 601, the geometric objects and shapes of the one or more loss mitigator graphical objects 801,803,804,805,806,807,808, 809, the predefined heights of the one or more loss mitigator graphical objects 801,803,804,805,806,807,808,809, the predefined depths of the one or more loss mitigator graphical objects 801,803,804,805,806,807,808,809, and predefined gaps between the base of the entity type graphical object 601 and one or more bases of one or more of the loss mitigator graphical objects 801,803,804,805,806,807,808,809 be seen in FIG. 8.

Turning now back to FIG. 2, at step 204 the method 200 selects loss data that will be used in the simulation. In one or more embodiments, step 204 comprises applying randomization rules to select a randomized loss sample set. In selecting the loss data, in one or more embodiments step 204 comprises selecting the loss data based upon the entity identifying information obtained at step 201. In one or more embodiments, 204 comprises selecting these loss data so that they realistically represent losses that a particular entity structure may experience.

At step 205, the method 200 selects a subset of the sample set of loss data selected at step 204 for use in a simulation. For example, step 205 can comprise sorting losses from the loss data selected at step 204 to generate a sorted randomized loss data set. In one or more embodiments, step 205 comprises sorting the losses from the loss data selected at step 204 by arranging them from smallest loss magnitude to largest loss magnitude.

Step 205 can further include dividing this sorted loss data into a predefined number of groups. In one or more embodiments, the predefined number of groups comprises one hundred groups. Step 204 can then select, evenly from the one hundred groups, a predefined number of losses from the randomized loss data for use in a simulation. The predefined number can vary based upon application, but is one thousand losses in one or more embodiments.

Optional decision 206 can determine how many times step 204 and step 205 can occur. Embodiments of the disclosure contemplate that a single year of loss data might provide too small a sample set for the confidence level to be truly "confident." Accordingly, in one or more embodiments step 204 and step 205 occur multiple times such that the selection of loss data occurring at step 205 can draw from a larger sample of loss data. In one or more embodiments, step 204 and step 205 occur one thousand times. Other numbers of iterations will be obvious to those of ordinary skill in the art having the benefit of this disclosure.

In one or more embodiments, step 207 then generates loss graphical objects from the visualization loss data set received from step 205. In one or more embodiments, step 207 generates these loss graphical objects by applying one or more modeling rules. For example, in one illustrative embodiment each loss graphical object has a visual appearance resembling a microbe or germ. In one or more embodiments, this menacing appearance serves as a visual queue that losses represented by the loss graphical objects have an adverse or deleterious effect on entity structures and/or impact mitigators. Similarly, step 207 can cause a magnitude, probability, identifiers, or other detail associated with each loss graphical object to become intuitively visible and identifiable as well.

Illustrating by example, in one or more embodiments each loss graphical object has a predefined color identifying the type of loss. In one or more embodiments, each loss graphical object has a predefined size identifying the magnitude of loss. In one or more embodiments, each loss graphical object has a predefined opacity representing the probability that another loss having a predefined magnitude will occur. Other graphical representations identifying characteristics of the loss graphical objects will be obvious to those of ordinary skill in the art having the benefit of this disclosure.

In one or more embodiments step 208 comprises delivering simulation data to a terminal device and causing the simulation to run (animate). In one or more embodiments, step 208 occurs in response to one or more terminal device events.

In one or more embodiments, step 209 comprises manipulating the graphical objects and simulations in response to terminal device interactions occurring at various user controls presented at the terminal device. For example, in one or more embodiments step 209 comprises rotating, tilting, panning, or spinning the entity type graphical object, starting or stopping the simulation, and so forth.

Figure 5:
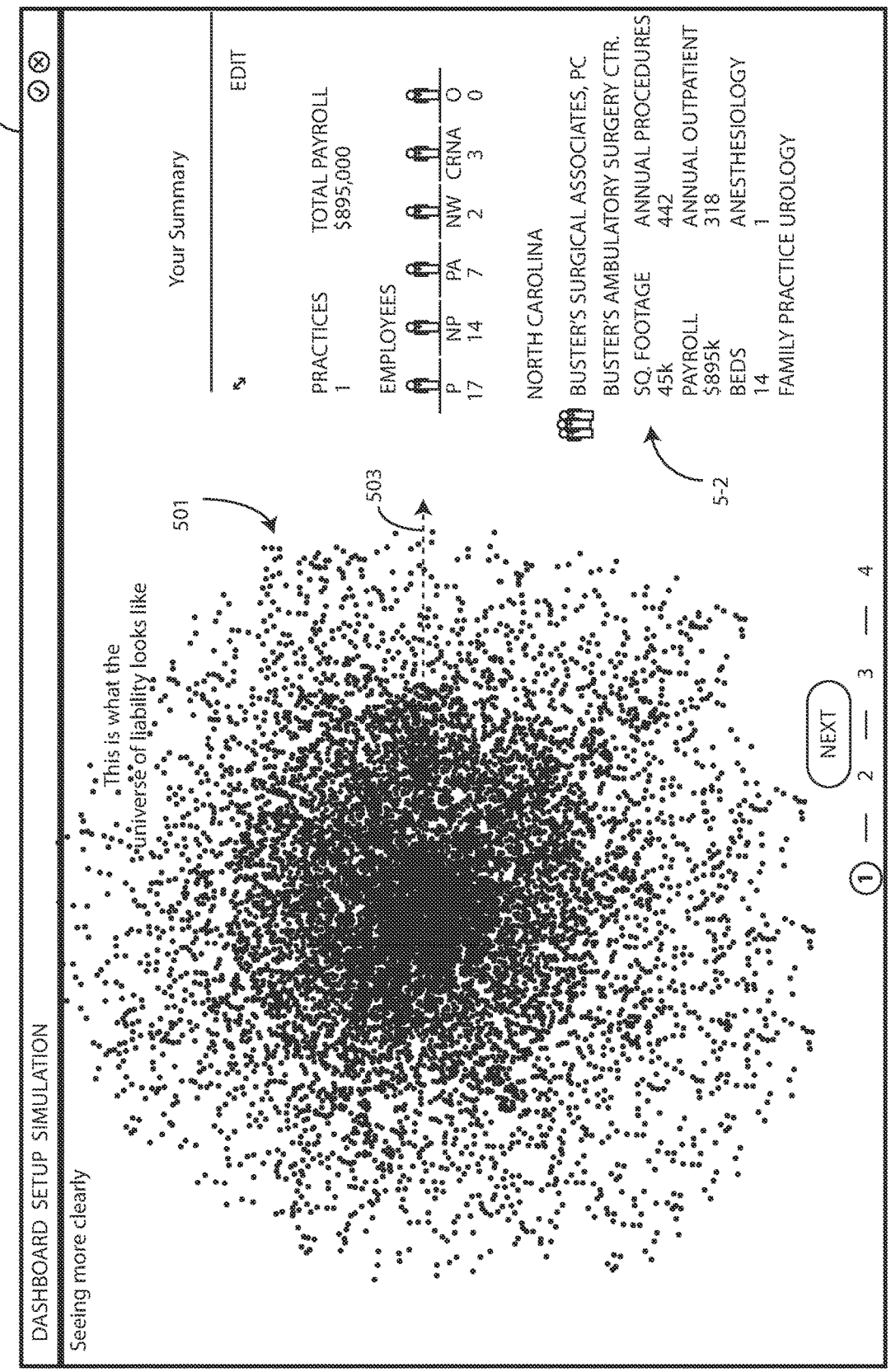
FIG. 5 illustrates a screen shot of one explanatory simulation and visualization system in accordance with one or more embodiments of the disclosure.

Turning now to FIG. 5, illustrated therein is one explanatory screen shot 500 depicting output of the system (100) of FIG. 1 or the method (200) of FIG. 2. The screen shot 500 of FIG. 5 is presented after the loss graphical objects 1501, the entity type graphical object, and/or one or more loss mitigator graphical objects have been generated. In one or more embodiments, the screen shot 500 of FIG. 5 is presented after the animation rule application engine has applied its animation rules to generate a simulation comprising the loss graphical objects 1501, the entity type graphical object, and/or the one or more loss mitigator graphical objects.

As shown in FIG. 15, in one or more embodiments the simulation begins by presenting only the loss graphical objects 501 at the user interface (112) of the terminal device (105). In this particular example, the simulation initially omits the presentation of either the entity type graphical object and/or the one or more loss mitigator graphical objects. However, as shown in FIG. 5, in one or more embodiments entity-defining information 502 is presented in the screen shot 500. In one or more embodiments, this presentation of the entity-defining information 502 provides a confirmation that the loss graphical objects 501 correspond to a particular entity, shown in FIG. 5 as "Buster's Surgical Associates." Thus, this presentation of the entity-defining information 502 provides a visual confirmation that the loss graphical objects 501 are those that Buster's type of entity may experience.

As shown in the illustrative embodiment of FIG. 5, in one or more embodiments the loss graphical objects 501 are presented in a radial pattern 503 at the user interface (112) of the terminal device (105). In one or more embodiments, the loss graphical objects 501 become denser and denser toward the center of the radial pattern 503, as shown in FIG. 5.

In one or more embodiments, the loss graphical objects 501 are animated in the screen shot 500 of FIG. 5. For example, in one embodiment the loss graphical objects 501 can gently swirl clockwise. In another embodiment, the loss graphical objects 501 can swirl counterclockwise. In still another embodiment, the loss graphical objects 501 can swirl in circles about their locations, much as the way germs or other microbes may move when suspended in the air. Other animation techniques suitable for making the loss graphical objects 501 move in the screen shot 500 of FIG. 5 will be obvious to those of ordinary skill in the art having the benefit of this disclosure.

Turning now to FIG. 6, illustrated therein is another screen shot 600 depicting output of the system (100) of FIG. 1 or the method (200) of FIG. 2 in accordance with one or more embodiments of the disclosure. As shown in FIG. 6, in one or more embodiments the screen shot 600 introduces the entity type graphical object 601 and/or the one or more loss mitigator graphical objects 602,603,604. In one or more embodiments, the screen shot 600 presents only the entity type graphical object 601 and/or the one or more loss mitigator graphical objects 602,603,604. Thus, as shown in FIG. 6, the loss graphical objects (501) of FIG. 5 have been removed. In one or more embodiments, this allows a viewer to examine and inspect the entity type graphical object 601 and/or the one or more loss mitigator graphical objects 602,603,604 initially without visual interference from the loss graphical objects (501) of FIG. 5.

In one or more embodiments, the entity-defining information (502) from the screen shot (500) of FIG. 5 has been replaced in the screen shot 600 of FIG. 6 with information 607 identifying the various loss mitigator graphical objects 602,603,604. In this illustrative embodiment, where the loss mitigator graphical objects 602,603,604 each correspond to insurance policies, the information 607 identifying the various loss mitigator graphical objects 602,603,604 can identify information such as type of loss the loss mitigator mitigates, the magnitude of mitigation the loss mitigator can provide for any one single loss, the magnitude of mitigation the loss mitigator can provide prior to depletion, and/or the threshold below which the loss mitigator will be ineffective, as well as other information such the cost associated with each loss mitigator.

In one or more embodiments the screen shot 600 embeds animation rules allowing the entity type graphical object 601 and/or the one or more loss mitigator graphical objects 602,603,604 to be manipulated. These animation rules can also be embedded to allow manipulation of the one or more loss graphical objects during the simulation as well. For example, in FIG. 6 it can be seen that the entity type graphical object 601 and the one or more loss mitigator graphical objects 602,603,604 have been panned and/or spun from an initial side elevation view to the perspective view of FIG. 6. Advantageously, this allows a viewer interacting with the screen shot 600 to "spin around" or "flip around" the entity type graphical object 601 for closer inspection. As will be shown below in FIG. 7, this also allows a viewer interacting with a screen shot showing the one or more loss graphical objects to inspect the details of each loss as well.

Once the inspection of the entity type graphical object 601 and/or the one or more loss mitigator graphical objects 602,603,604 is complete, in one or more embodiments the screen shot 600 includes a user actuation target 608 that launches the animation portion of the simulation to demonstrate how one or more losses represented by the various loss graphical objects (501) of FIG. 5 affect the entity type graphical object 601 and/or the one or more loss mitigator graphical objects 602,603,604. To launch the simulation, in one or more embodiments a user may employ a mouse or other user interface tool to "click" the user actuation target 608.

Figure 7:
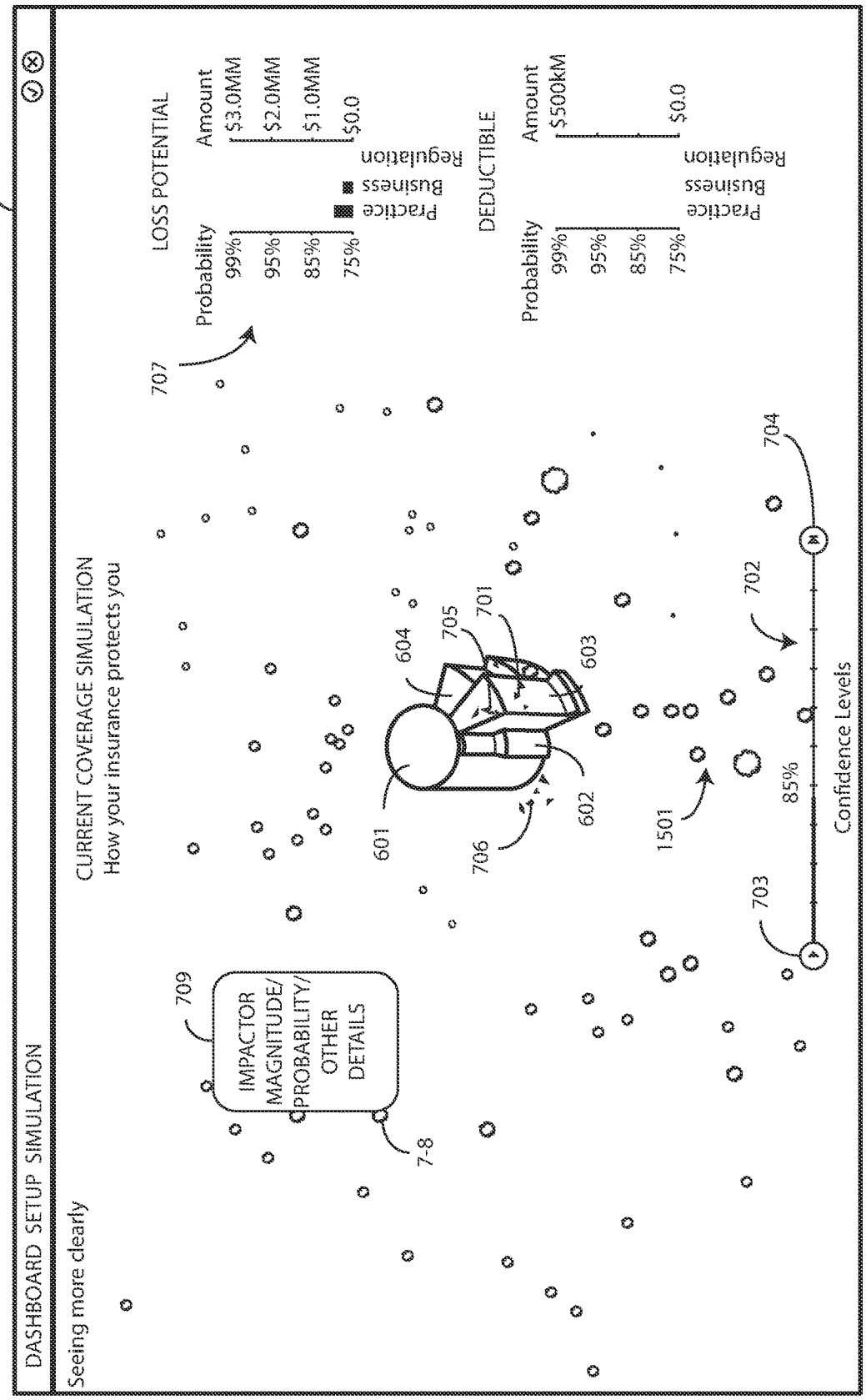
FIG. 7 illustrates still another screen shot of one explanatory simulation and visualization system in accordance with one or more embodiments of the disclosure.

Turning now to FIG. 7, illustrated therein is another screen shot 700 depicting output of the system (100) of FIG. 1 or the method (200) of FIG. 2 in accordance with one or more embodiments of the disclosure. As shown in FIG. 7, the embedded animation rules cause the loss graphical objects 501 of FIG. 5 to be introduced around the entity type graphical object 601 and/or the one or more loss mitigator graphical objects 602,603,604.

In one or more embodiments, the loss graphical objects 501 move in an animated fashion about the entity type graphical object 601 and/or the one or more loss mitigator graphical objects 602,603,604. For example, the loss graphical objects 501 can move in a circular fashion about the entity type graphical object 601 and/or the one or more loss mitigator graphical objects 602,603,604 so as to encircle the entity type graphical object 601 and/or the one or more loss mitigator graphical objects 602,603,604. The eeriness of these microbe or germ like loss graphical objects 501 swirling about the entity type graphical object 601 and/or the one or more loss mitigator graphical objects 602,603,604 provides a visual cue that each will have an adverse impact on one or both of the entity type graphical object 601 and/or the one or more loss mitigator graphical objects 602,603,604 when they collide 701 with the same.

In one or more embodiments, the animation of screen shot 700 proceeds as a function of confidence level. In the illustrative embodiment of FIG. 7, a confidence level meter 702 is presented to show at what confidence level the simulation is currently presenting. In FIG. 7, the confidence level is about eighty-five percent. This means that there is probability of eighty-five percent that loss graphical objects having a magnitude larger than those already impacting one or both of entity type graphical object 601 and/or the one or more loss mitigator graphical objects 602,603,604 will impact one or both of the entity type graphical object 601 and/or the one or more loss mitigator graphical objects 602,603,604.

In one or more embodiments, as the confidence level meter 702 is bounded by two user actuation targets 703,704. A first user actuation target 703 can be used to pause and start the simulation. When paused, the loss graphical objects 501 temporarily cease moving in the circular fashion about the entity type graphical object 601 and/or the one or more loss mitigator graphical objects 602,603,604. During pauses of the simulation, or when the simulation is active, the graphical objects of the simulation can be panned, rotated, flipped, or manipulated to better inspect the interactions of the loss graphical objects 501 with the entity type graphical object 601 and/or the one or more loss mitigator graphical objects 602,603,604. A second user actuation target 704 fast-forwards the simulation to completion.

In one or more embodiments, as a given loss graphical object, e.g., loss graphical object 705, impacts either the entity type graphical object 601 and/or the one or more loss mitigator graphical objects 602,603,604, it explodes by spewing debris 706, thereby simulating the adverse affect the loss graphical object 705 had on the entity type graphical object 601, the one or more loss mitigator graphical objects 602,603,604, or both. As shown in FIG. 7, in one or more embodiments when a loss graphical object 705 impacts a loss mitigator graphical object, e.g., loss mitigator graphical object 602, its height, width, or combinations thereof can be reduced to depict the reduction in one or both of the magnitude of mitigation the loss mitigator can provide for any one single loss and/or the magnitude of mitigation the loss mitigator can provide prior to depletion.

In one or more embodiments, cumulative totals 707 of the magnitudes of the adverse affects that are borne by the entity type graphical object 601 in response to the loss graphical objects 501 impacting either the entity type graphical object 601 or the one or more loss mitigator graphical objects 602,603,604 can be presented to the side of the simulation. In the illustrative embodiment of FIG. 7, these cumulative totals 707 comprise losses beyond those mitigated by the one or more loss mitigator graphical objects 602,603,604. Other cumulative totals can comprise cumulative losses due to the accumulation of threshold losses below which the one or more loss mitigator graphical objects 602,603,1604 are ineffective. Other cumulative totals for presentation to the side of the simulation will be obvious to those of ordinary skill in the art having the benefit of this disclosure. These cumulative totals can accrue as the simulation progresses.

In one or more embodiments, the entity type graphical object 601 turns a different color when sustaining adverse impacts from the loss graphical objects 501. For instance, in addition to exploding with debris 706, the entity type graphical object 601 can momentarily turned from white to red, with a bit of a strobe like flash occurring. This allows stakeholders watching the screen shot 700 to "see the pain" occurring when loss graphical objects 501 hit the entity type graphical object 601. The pain is especially acute when inadequate loss mitigator graphical objects 602,603,604 were initially present and have become depleted, thereby leaving the entity type graphical object 601 exposed.

As the simulation proceeds and more loss graphical objects 501 interact with the entity type graphical object 601 or the one or more loss mitigator graphical objects 602,603, 604, there will be fewer and fewer loss graphical objects 501 left that may impact either the entity type graphical object 601 or the one or more loss mitigator graphical objects 602,603,604. Further, the cumulative totals 707 of the magnitudes of the adverse affects that are borne by the entity type graphical object 601 in response to the loss graphical objects 501 impacting either the entity type graphical object 601 or the one or more loss mitigator graphical objects 602,603,604 will continue to increase.

As shown in FIG. 7, in one or more embodiments when a loss graphical object 705 impacts a loss mitigator graphical object, e.g., loss mitigator graphical object 602, its height, width, or combinations thereof can be reduced to depict the reduction in one or both of the magnitude of mitigation the loss mitigator graphical object 602 can provide for any one single loss and/or the magnitude of mitigation the loss mitigator graphical object 602 can provide prior to depletion. In this illustrative embodiment, both the height and width have been decreased, thereby illustrating the reduced potency of the loss mitigator graphical object 602. Similarly, the heights and width of loss mitigator graphical objects 602,603 have been reduced due to the interactions with the loss graphical objects 501 that have occurred from the zero percent confidence level to the eighty-five percent confidence level.

In one or more embodiments, the screen shot 700 includes animation rules causing the loss graphical objects 501 to have metadata associated therewith. In one or more embodiments, this metadata comprises loss specific information. Advantageously, the inclusion of this metadata allows a user to perform a terminal device interaction event interacting with a selected loss graphical object with the controls of the animation to pause the animation and interact with a loss graphical object 708 to reveal a loss information window 709. In one or more embodiments, the loss information window 709 reveals a graphical presentation of the description of the loss graphical object 708, e.g., its type, severity type, magnitude, probability of occurrence, and other information. Illustrating by example, if the loss is a fire occurrence having a magnitude of twenty-five million units and occurring at the ninety-five percent confidence level, a terminal device interaction event interacting with this loss graphical object 7081 would reveal these or other facts in the loss information window in one or more embodiments.

Figure 3:
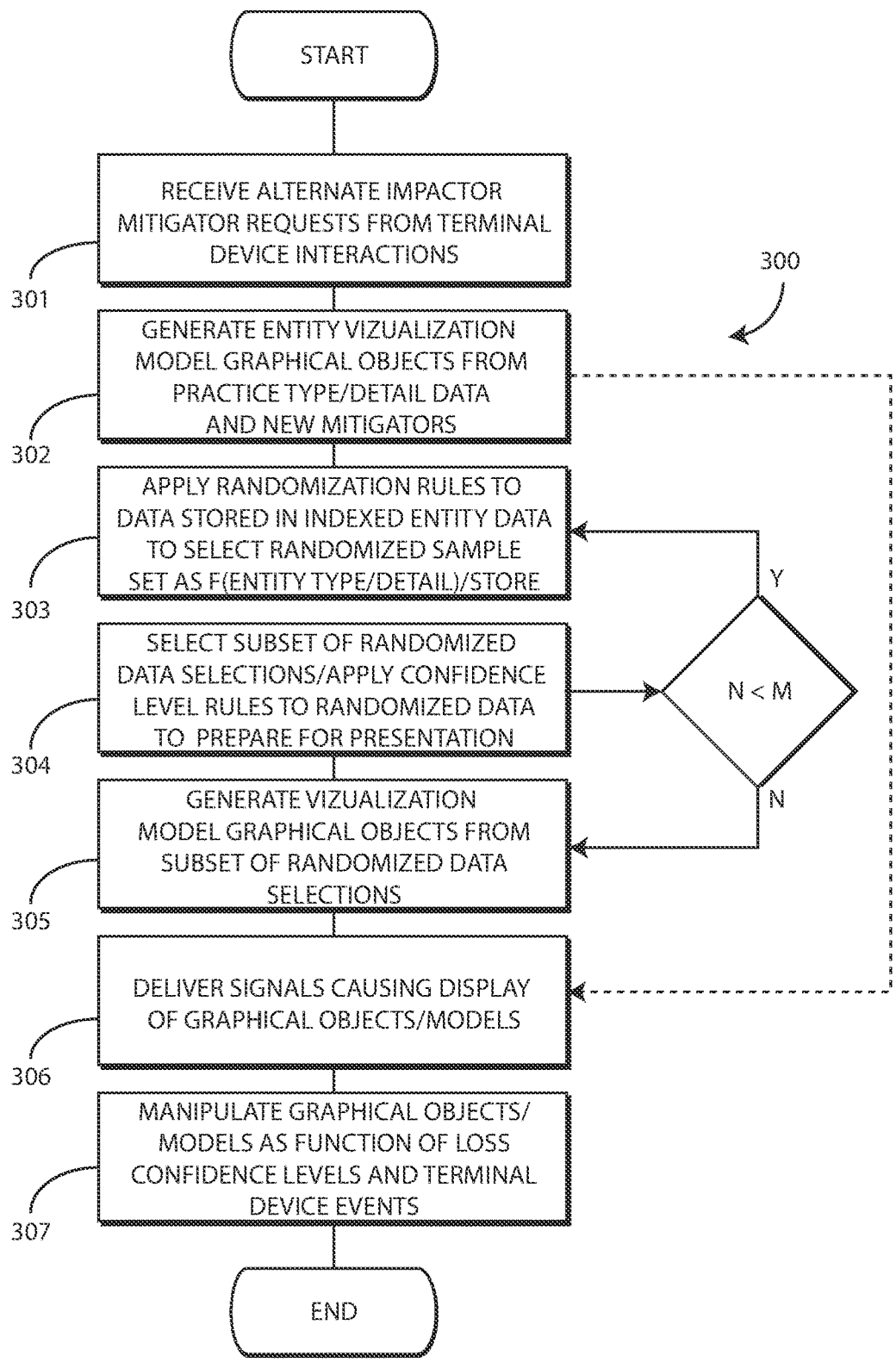
FIG. 3 illustrates another explanatory method for simulating and visualizing loss effects upon an entity in accordance with one or more embodiments of the disclosure.

In one or more embodiments, the animation proceeds until the 99.9 percent confidence level is reached. The description above referring to FIGS. 1, 2, and 5-7 has been directed at providing a simulation that generates simulation objects representing a present state of an entity and its loss mitigators. Embodiments of the disclosure contemplate that it can be advantageous to provide simulations that illustrate comparatively how the entity would fare with a more robust loss mitigator schema. Accordingly, in one or more embodiments an alternate or improved loss mitigator strategy is selected for the entity structure for use in a subsequent simulation. Turning now to FIG. 3, illustrated therein is one method 300 by which this can occur.

Beginning at step 301, the method 300 selects an alternate loss mitigator strategy for the entity structure that mitigates affects of one or more of the loss graphical objects interacting with the entity type graphical object in the prior simulation. In one or more embodiments, step 301 selects the alternate loss mitigator strategy by receiving one or more inputs defining changes to the one or more loss mitigator graphical objects. Accordingly, after viewing the simulation of FIGS. 5-7, user input can indicate a variety of requests regarding the loss mitigator performance occurring in the simulation of FIGS. 5-7.

For example, in one or more embodiments the user inputs may indicate a desire to obtain new loss mitigators in response to certain types of losses being considered problematic during the first simulation. In other embodiments, the user inputs may identify options for adding, removing, increasing, or decreasing loss mitigator specifications. In one or more embodiments, these loss mitigator specifications can include the type of loss an existing or desired loss mitigator mitigates, the magnitude of mitigation the loss mitigator can provide for any one single loss, the magnitude of mitigation the loss mitigator can provide prior to depletion, and/or the threshold below which the loss mitigator will be ineffective.

In one or more embodiments, step 301 then comprises selecting alternate loss mitigator implementations that satisfy the requests for changes in the one or more inputs.

In one or more embodiments, step 302 comprises generating one or more alternate loss mitigator graphical objects from the information received at step 301. Techniques for how this can be accomplished are described above with reference to FIGS. 1 and 2. Others will be obvious to those of ordinary skill in the art having the benefit of this disclosure.

In one or more embodiments, the loss data used in the simulation of FIGS. 5-7 can simply be used again in subsequent simulations. Where this occurs, the method 300 can optionally proceed to step 306.

However, in other embodiments, new loss data can be selected. Some entities may prefer that a newly randomized set of loss data be selected to ensure that there is no "curve fitting" occurring by selecting new loss mitigators that only satisfy the loss data occurring in the simulation of FIGS. 5-7. Accordingly, the entity may want new loss data selected, and new simulations run, one, two, three, or more times. Accordingly, the method 300 of FIG. 3, including steps 303-305, can be repeated as many times as necessary.

Step 306 comprises delivering simulation data to a user interface (112) of a terminal device (102,103,104,105) and causing the simulation to run (animate) in response to one or more user inputs at the user interface (112) of the terminal device (102,103,104,105). Step 307 comprises manipulating the graphical objects and simulations in response to terminal device interactions occurring at various user controls presented at the terminal device.

Turning now to FIG. 8, illustrated therein is a screen shot 800 illustrating how the subsequent simulation can occur. Illustrated therein is the entity type graphical object 601 and one or more alternate loss mitigator graphical objects 801, 803,804,805,806,807,808,809 generated from the optimized loss mitigator information received at step (301) of the method (300) of FIG. 3 above. As shown in FIG. 8, in one or more embodiments the entity type graphical object 601 remains the same as shown above in FIGS. 5-7. However, the one or more loss mitigator graphical objects 801,803, 804,805,806,807,808,809 are new.

In one or more embodiments, actuation of the user actuation target 810 causes information about the specific type of loss mitigator to be presented. For example, actuation of user actuation target 810 causes information such as the magnitude of mitigation the loss mitigator can provide for any one single loss, the magnitude of mitigation the loss mitigator can provide prior to depletion, and/or the threshold below which the loss mitigator will be ineffective. Other information is shown in FIG. 8. Still other presentable information will be obvious to those of ordinary skill in the art having the benefit of this disclosure. Actuating different user actuation targets causes information with different types of loss mitigators to be shown.

Figure 9:
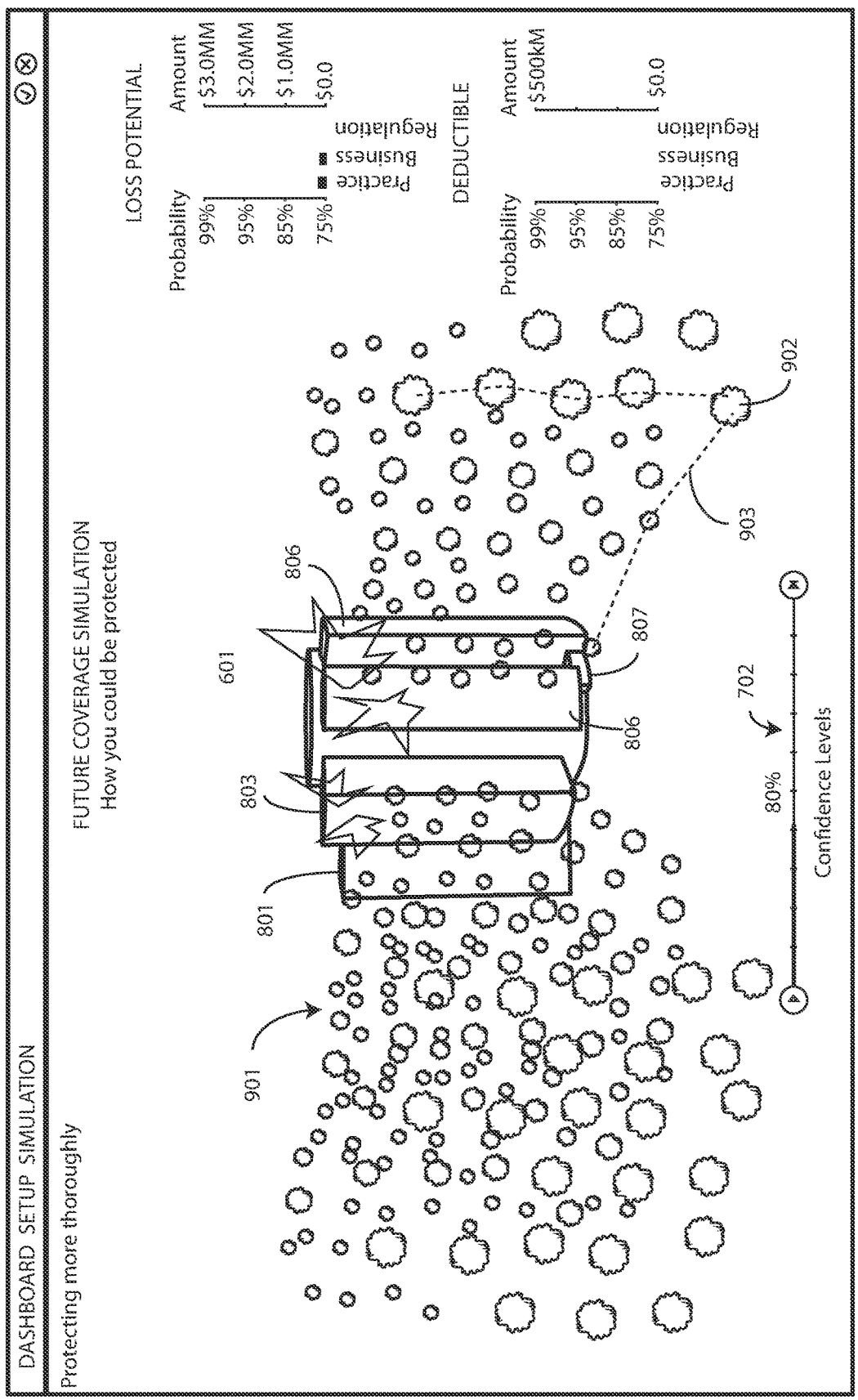
FIG. 9 illustrates another screen shot of one explanatory simulation and visualization system in accordance with one or more embodiments of the disclosure.

Once the inspection of the entity type graphical object 601 and/or the one or more loss mitigator graphical objects 801,803,804,805,806,807,808,809 is complete, actuation of user actuation target 811 launches the second simulation. Turning now to FIG. 9, the loss graphical objects 901 selected in accordance with either the method (200) of FIG. 2, and reused, or selected in accordance with the method (300) of FIG. 3 are introduced around the entity type graphical object 1601.

In one or more embodiments, the loss graphical objects 901 of FIG. 9 can be configured move in an animated fashion about the entity type graphical object 601 and/or the one or more loss mitigator graphical objects 801,803,806, 807,808, as described above with reference to FIG. 7. For example, the loss graphical objects 901 can move in a circular fashion about the entity type graphical object 601 and/or the one or more loss mitigator graphical objects 801,803,806,807,808 so as to encircle the entity type graphical object 601 and/or the one or more loss mitigator graphical objects 801,803,806,807,808.

In the illustrative embodiment of FIG. 9, the loss graphical objects 901 are presented in columns and rows extending radially out from each loss mitigator graphical object, with the types of loss mitigator graphical objects 801,803,806, 807,808 being aligned radially with the type of loss graphical object 901 the loss mitigator graphical objects 801,803, 806,807,808 mitigate. In one or more embodiments, this allows the loss graphical objects 901 situated within a radial row 903 aligned with a particular loss mitigator graphical object 902 to fly directly at the corresponding loss mitigator graphical object 902 along a radial path rather than circling. In one or more embodiments, this more orderly simulation arrangement and sorting of the loss graphical objects 901 identifies both the fact that the user inputs defining the alternate loss mitigator strategy truly understand the risks to the entity resulting from the loss graphical objects 901 and the fact that the optimized loss mitigator strategy will truly manage this risk. Other configurations for the loss graphical objects 901 will be obvious to those of ordinary skill in the art having the benefit of this disclosure.

Figure 4:
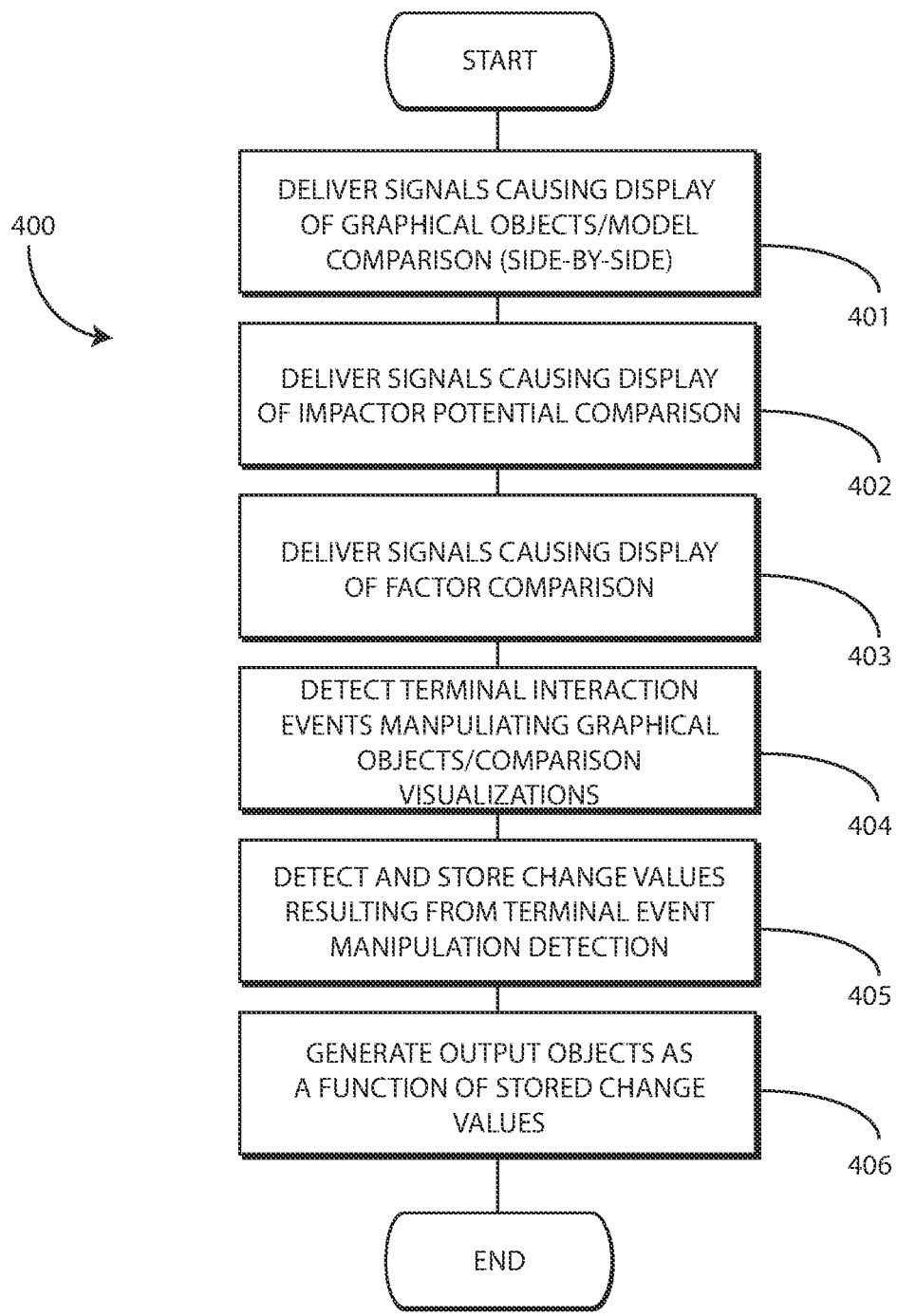
FIG. 4 illustrates still another explanatory method for simulating and visualizing loss effects upon an entity in accordance with one or more embodiments of the disclosure.

As before, the second simulation continues until the 99.9 percent confidence level is reached, as indicated on the confidence level meter 702. Embodiments of the disclosure contemplate that it can be advantageous to compare how the "as is" loss mitigator strategy highlighted in the first simulation compares to the "alternate" loss mitigator strategy highlighted in the second simulation. Accordingly, in one or more embodiments the simulation system provides a comparison between the one or more loss mitigator graphical objects presented in the first simulation and the alternate loss mitigator graphical objects of the second simulation. Turning now to FIG. 4, illustrated therein is one explanatory method 1200 of how this can occur.

Beginning at step 401, the method 400 delivers a graphical comparison of the results of the performance of the "as is" loss mitigator strategy highlighted in the first simulation to be simultaneously presented adjacent to the alternate loss mitigator strategy highlighted in the second simulation. At step 402, the method 400 delivering a graphical comparison of the cumulative totals of the first simulation to be simultaneously presented adjacent to the cumulative totals of the second simulation. At step 303, method 300 comprises delivering a graphical comparison of the other cumulative totals of the first simulation to be simultaneously presented adjacent to the other cumulative totals of the second simulation. One such comparison is shown in FIG. 10.

Figure 10:
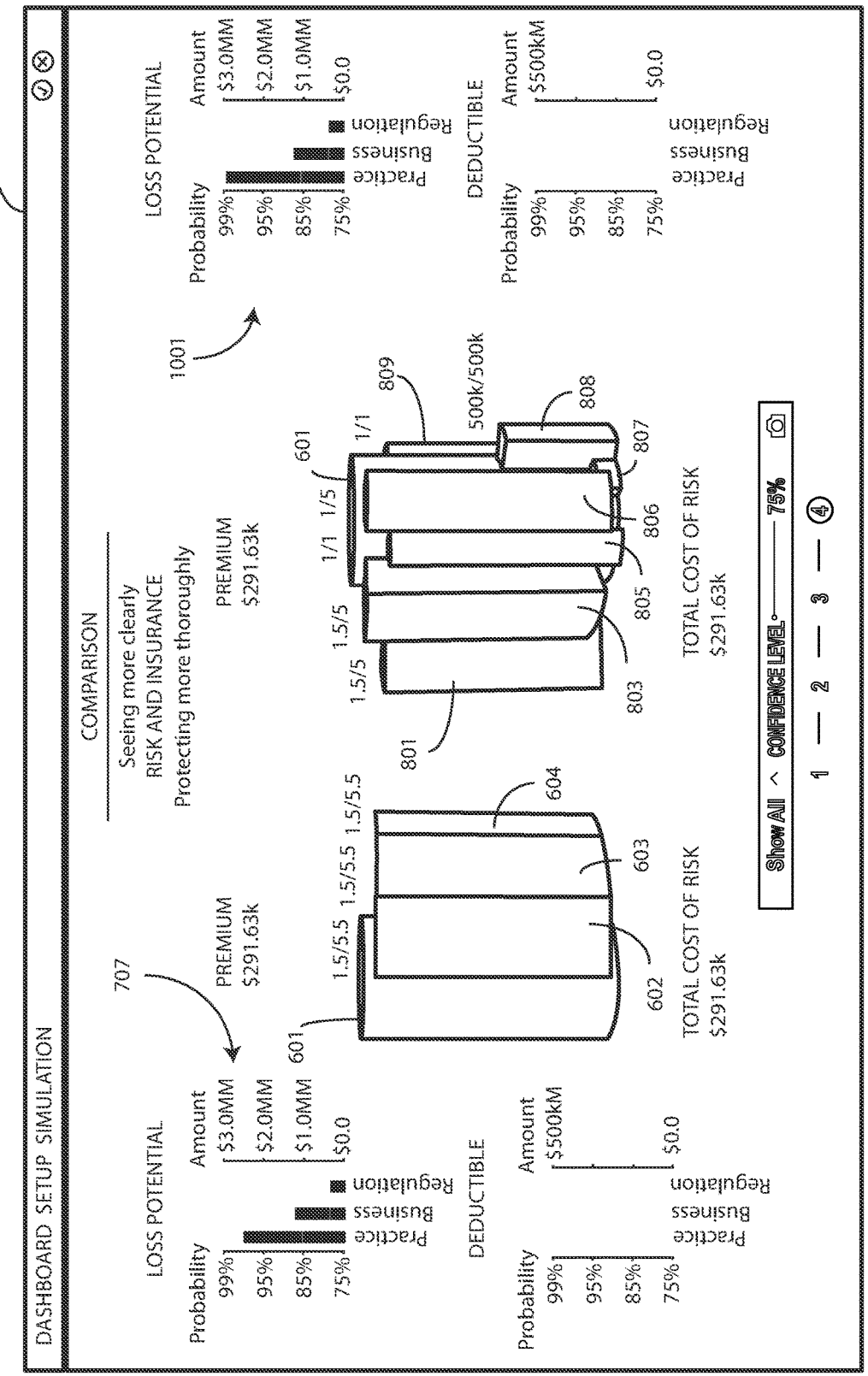
FIG. 10 illustrates another screen shot of one explanatory simulation and visualization system in accordance with one or more embodiments of the disclosure.

Turning now to FIG. 10, illustrated therein is one screen shot 1000 presenting a comparison of the results of the first simulation, illustrated above in FIGS. 5-7, which illustrated the effect of losses on an entity structure with its "as-is" loss mitigator strategy, and the results of the second simulation, illustrated above in FIGS. 8-9, which illustrated the effects of losses on the entity structure with the "alternate" loss mitigator strategy. In one or more embodiments, this comparison provides graphical object and tabular output results in a single screen shot 1000, as shown in FIG. 10.

In one or more embodiments, the entity type graphical object 601 and the one or more loss mitigator graphical objects 602,603,604 from the first simulation are presented side-by-side and adjacent to the entity type graphical object 601 and the one or more loss mitigator graphical objects 801,803,806,807,808 from the second simulation. Characteristics, such as information illustrating type of loss an existing or desired loss mitigator mitigates, the magnitude of mitigation the loss mitigator can provide for any one single loss, the magnitude of mitigation the loss mitigator can provide prior to depletion, and/or the threshold below which the loss mitigator will be ineffective, can all be presented in the screen shot 1000.

In one or more embodiments, the cumulative totals 707 from the first simulation can be presented adjacent to the cumulative totals 1001 from the second simulation as well. In so doing, a viewer can immediately and efficiently compare the effects upon the entity when the "as-is" loss mitigator strategy is employed, versus the corresponding impact upon the entity when the alternate loss mitigator strategy is used. Similarly, other cumulative totals can be presented in a side-by-side arrangement as well.

In one or more embodiments, the screen shot 1000 embeds animation rules allowing one or both of the entity type graphical object 601 and the one or more loss mitigator graphical objects 602,603,604 from the first simulation and/or the entity type graphical object 601 and the one or more loss mitigator graphical objects 801,803,806,807,808 from the second simulation to be manipulated. Illustrating by example, in one or more embodiments either graphical object combination can be panned and/or spun between side elevation views, top plan views, and perspective views from various observation points. Advantageously, this allows a viewer interacting with the these graphical objects to be spun, pivoted, flipped, rotated, or otherwise repositioned to allow closer inspection of the differences presented in the screen shot 1000.

Turning back to FIG. 3, in one or more embodiments step 304 can comprise detecting user inputs at the user interface (112) of the terminal device (102,103,104,105) manipulating graphical objects and/or comparison simulations of the presented comparison. For example, in one or more embodiments user inputs can adjust information such as the presentation of alternate loss mitigator implementations mitigated. The user inputs can also adjust the presented magnitude of mitigation the loss mitigator can provide for any one single loss. The user inputs can also adjust the magnitude of mitigation the loss mitigator can provide prior to depletion. The user inputs can still further adjust the threshold below which the loss mitigator will be ineffective.

Step 305 can store these manipulations. In one or more embodiments, step 306 then takes these extracted values from step 305 and generates an output object. In one or more embodiments, the output object is a contract by which a person can buy insurance defined by the desired insurance policy or policies, desired deductibles for each policy, desired limits for each policy, and so forth, as identified in step 305. In one or more embodiments, all the person needs to do is apply one or more signatures and/or initials to the output object to bind the various insurance policies identified in step 305. Other examples of output objects will be obvious to those of ordinary skill in the art having the benefit of this disclosure.

Figure 11:
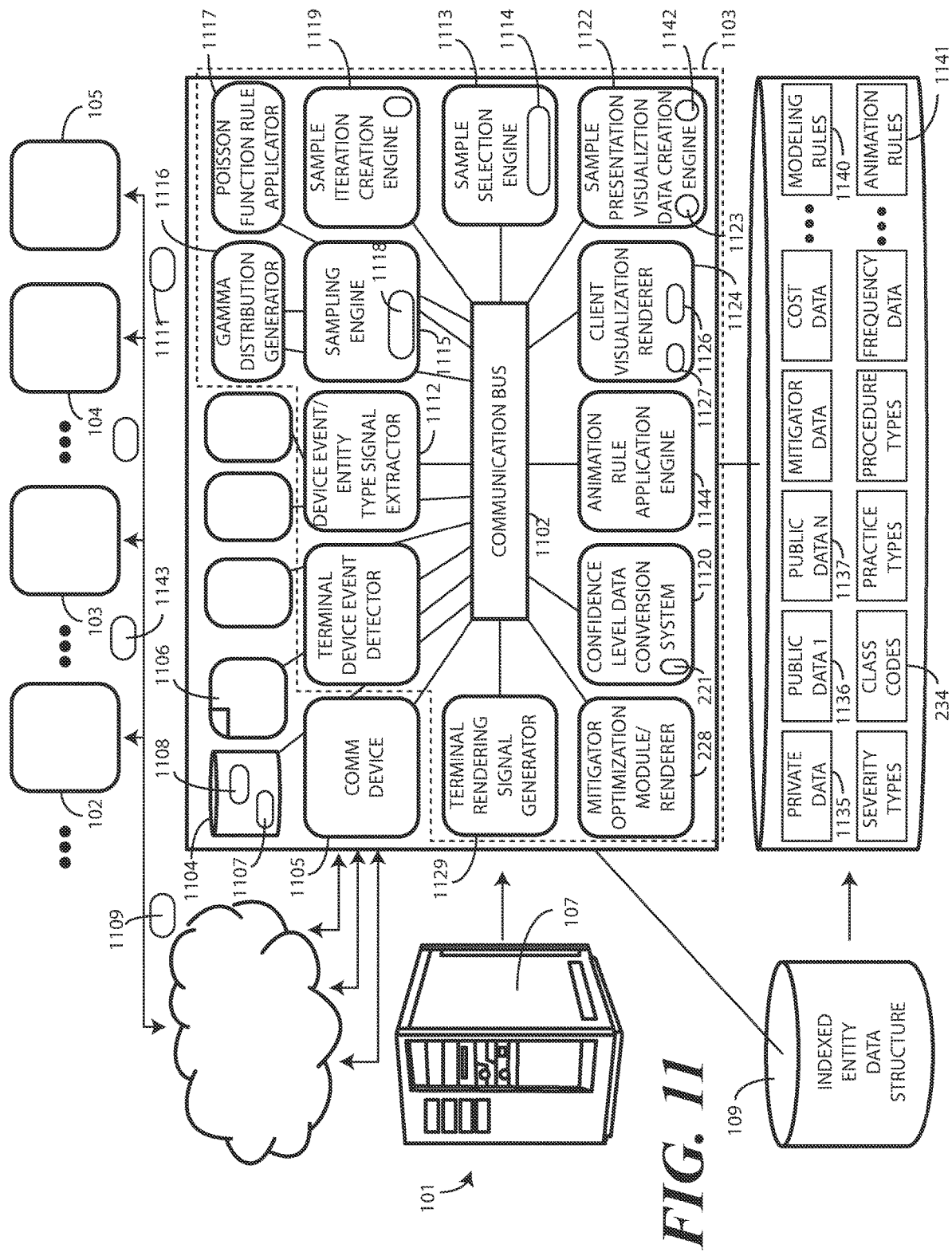
FIG. 11 is a block diagram of a computing environment that implements a system and method for simulating and visualizing loss effects upon an entity in accordance with one or more embodiments of the disclosure.

Turning now to FIG. 11, illustrated therein is a block diagram of an example computing environment for a system (100) that may be used to implement the systems and methods described herein. In the illustrative embodiment of FIG. 11, server 107 includes a communication bus 1102. In one or more embodiments, the communication bus 1102 facilitates communications between one or more processors 1103, one or more memory devices 1104, persistent storage devices such as the indexed entity data structure 109, communication devices 1105, and one or more user interface devices 1106, which can include a display and data entry components.

In one or more embodiments, the one or more processors 1103 are configured to execute operations in the form of computer readable instructions that may be stored in the one or more memory devices 1104. The one or more processors 1103 can include a single processor, a plurality of processors, a multi-processor core, or some other type of processor(s) in one or more embodiments.

In one or more embodiments, the one or more memory devices 1104 may comprise data, program code, firmware, or other storage devices. The one or more memory devices 1104 may also be described as computer-readable storage devices in one or more embodiments. Program code 1108, modules, and computer-readable instructions 1107 for the one or more processors 1103 may be located in the one or more memory devices 1104.

The communication device 1105, in one or more embodiments, facilitates electronic signal and data communication with other data processing systems or devices, such as the one or more terminal devices 102,103,104,105. In one or more embodiments, the communication device 1105 is configured for wired or wireless communications with these devices, and can include a receiver and transmitter, or alternatively a transceiver.

The various components illustrated and described in FIG. 11 for the server complex 101 are illustrative only, and are not intended to define architectural limitations regarding the ways in which a server complex 101 in accordance with embodiments of the disclosure may be implemented. The various components may be configured in a server complex that includes components in addition to and/or in place of those illustrated in FIG. 11. Moreover, the server complex 101 may include other components than those shown in FIG. 11.

In one or more embodiments, the one or more processors 1103 can define one or more process engines used in a simulation system. The process engines can perform portions of a method of generating entity type graphical objects, loss mitigator graphical objects, and loss graphical objects for the simulation system. The process engines can further apply rules when selecting, for example, loss data to ensure that the loss data is relevant to a particular entity type and structure, that the loss data is representative of actual loss data that a particular entity type may sustain, and to ensure that the loss data is distributed with a randomness that replicates statistical models representing actual loss events.

In one or more embodiments, a terminal device event detector 1110 receives terminal device interaction events 1111, which can comprise user input occurring at a terminal device 102,103,104,105, and which are configured as computer-readable signal media 1109 transmitted from at least one of the one or more terminal devices 102,103,104,105. In one or more embodiments, the terminal device interaction events 1111 comprise user interactions with user interface devices occurring at terminal devices 102,103,104,105.

In one or more embodiments, entities can be pre-classified and arranged into one or more predefined class codes 1134. These predefined class codes 1134 can be stored in stored in persistent storage devices such as the indexed entity data structure 109 in one or more embodiments. Alternatively, the terminal device interaction events 1111 can identify the predefined class codes 1134 assigned to the entity as well.

In one or more embodiments, the one or more processors 1103 consider only predefined class code 1134 when selecting loss data 1135,1136,1137 for the simulation system. In other embodiments, the one or more processors 1103 may consider information beyond the predefined class code 1134 for a better and more realistic selection of loss data 1135,1136,1137 for a particular entity.

A device event entity type signal extractor 1112 can extract entity type and entity identifying information from the computer-readable signal media 1109 received from the terminal device event detector 1110. A sample selection engine 1113 then selects sample set 1114 of loss data from indexed entity data structure 109. To ensure that a truly random, and realistic, selection of the sample set 1114 of loss data occurs, a sample rule set application engine 1115 can be included to work in conjunction with the sample selection engine 1113.

A sample iteration generation engine 1119 can cause a predefined number of simulations to occur, where each simulation that models losses impacting an entity and/or its impact mitigators across a predefined time interval, with the predefined number of simulations representing a predefined number of those time intervals. In one or more embodiments, the sample rule set application engine 1115 ensures that each simulation of this number of simulations is randomized from each other simulation in the number of simulations by applying one or more rules by which the sample rule set application engine 1115 must comply when selecting losses from the loss data 1135,1136,1137. These rules ensure that the losses selected from the loss data 1135,1136,1137 are realistic in that they vary from time period to time period, in number, severity, and frequency, while at the same time ensuring that a desired frequency is the mean across the plurality of time periods. These rules can be provided by a gamma distribution generator 1116 and a Poisson function rule applicator 1117 to achieve this goal of randomizing from time period to time period across a plurality of time periods, while achieving a desired frequency per time period, or other metric, across the plurality of time periods.

Once randomized by the application of these rules, the sample set 1114 is transformed and output as randomized loss data 1118. Thus, the process described above with reference to the sample selection engine 1113, the sample rule set application engine 1115, operating in conjunction with the gamma distribution generator 1116 and the Poisson function rule applicator 1117, and sample iteration generation engine 1119, outputs a sample set 1114 of loss data as randomized loss data 1118. In one or more embodiments, the randomized loss data 1118 comprises a set of losses that a given entity structure probabilistically will encounter across a number of time periods defined by the sample iteration generation engine 1119. Thus, if the sample iteration generation engine 1119 defined a period of 1000 years as the iteration window, the randomized loss data 1118 would then comprise the losses the entity structure probabilistically would encounter across the 1000-year window.

However, as noted above, one of the principal advantages of embodiments of the disclosure is that the randomized loss data 1118 is presented not as a function of time, but rather as a function of confidence level. In one or more embodiments, the confidence level data conversion system 1120 is responsible for converting the randomized loss data 1118 into a visualization loss data set 1121. The confidence level data conversion system 1120 performs this process primarily across three different operations. First, the confidence level data conversion system 1120 sorts losses from the randomized loss data 1118 from least severity to highest severity to generate a sorted randomized loss data set. Second, the confidence level data conversion system 1120 divides this sorted loss data into one hundred groups. Third, the confidence level data conversion system 1120 selects, evenly from the one hundred groups, a predefined number of losses from the randomized loss data 1118 that will be used for the visualization. The predefined number can vary based upon application and visualization output capability. In one or more embodiments, the predefined number is one thousand losses.

The visualization loss data set 1121 is then fed into a sample presentation visualization data generation engine 1122. In one or more embodiments, the sample presentation visualization data generation engine 1122 primarily performs two operations: First, it correlates the visualization loss data set 1121 to a given entity structure. Second, it generates loss graphical objects 1123 from the visualization loss data set 1121 by applying one or more modeling rules 1140 stored in the indexed entity data structure 109 or another memory or storage device.

In one or more embodiments, the sample presentation visualization data generation engine 1122 generates loss graphical objects 1123 from the visualization loss data set 1121 by applying one or more modeling rules 1140. In a similar fashion to the way that the sample presentation visualization data generation engine 1122 also generates loss graphical objects 1123 from the visualization loss data set 1121 by applying one or more modeling rules 1140, in one or more embodiments a entity visualization renderer 1124 generates an entity type graphical object 1126 and/or one or more loss mitigator graphical objects 1127 for the visualization system.

In one or more embodiments, once the sample presentation visualization data generation engine 1122 generates loss graphical objects 1123 from the visualization loss data set 1121 and the entity visualization renderer 1124 generates an entity type graphical object 1126 and/or one or more loss mitigator graphical objects 1127 for the visualization system, an animation rule application engine 1144 then applies one or more animation rules 1141 to generate a simulation comprising the loss graphical objects 1123, the entity type graphical object 1126, and/or the one or more loss mitigator graphical objects 1127. In one or more embodiments the animation rule application engine 1144 generates simulations using the loss graphical objects 1123, the entity type graphical object 1126, and/or the one or more loss mitigator graphical objects 1127 that make all of the concepts described above with reference to the rules employed by the sample rule set application engine 1115, the modeling rules 1140, and other rules simple, quick, and easy to see, understand, and visualize.

In one or more embodiments, the animation rule application engine 1144 applies one or more animation rules 1141 to generate a simulation. In one or more embodiments, the simulation proceeds like a temporal video. However, events in the simulation do not occur as a function of time. They instead occur as a function of confidence level. In one or more embodiments, the simulation proceeds until the 99.9 percent confidence level is reached.

In one or more embodiments, once this occurs the initial simulation generated by the animation rule application engine 1144 stops. However, in one or more embodiments the visualization does not. In one or more embodiments, a loss mitigator optimization engine 1128 then selects an alternate loss mitigator strategy for the entity structure that mitigates affects of one or more of the loss graphical objects 1123 interacting with the entity type graphical object 1126 in the prior simulation. In one or more embodiments, the loss mitigator optimization engine 1128 selects the alternate loss mitigator strategy in response to terminal device interaction events 1111.

In one or more embodiments, the loss mitigator optimization engine 1128 then selects alternate loss mitigator implementations that satisfy the requests for changes in the type of loss an existing or desired loss mitigator mitigates, the magnitude of mitigation the loss mitigator can provide for any one single loss, the magnitude of mitigation the loss mitigator can provide prior to depletion, and/or the threshold below which the loss mitigator will be ineffective. Once this occurs, this information is delivered to the sample presentation visualization data generation engine 1122. In one or more embodiments, the sample presentation visualization data generation engine 1122 can generate alternate loss mitigator graphical objects 1142 for the optimized loss mitigator implementations generated by the loss mitigator optimization engine 1128.

In one or more embodiments, the alternate loss mitigator graphical objects 1142 are then delivered to the animation rule application engine 1144. The animation rule application engine 1144 then once again applies one or more animation rules 1141 to generate a second visualization in one or more embodiments.

Thus, in one or more embodiments the animation rule application engine 1144 repeats the generation of the simulation, again as a function of confidence level, to illustrate a comparison between the one or more loss mitigator graphical objects 1127 presented in the initial animation and the alternate loss mitigator graphical objects 1142. In one or more embodiments, this second simulation serves to intuitively express the results of loss impact when the alternate loss mitigator graphical objects 1142 represent an improved loss mitigator implementation over that presented in the first simulation.

In one or more embodiments a terminal rendering signal generator 1129 generates computer-readable graphic object signals 1143 suitable for rendering the resulting simulations on one or more of the terminal devices 102,103,104,105. Thus, in one or more embodiments the loss graphical objects 1123, entity type graphical object 1126, the one or more loss mitigator graphical objects 1127 of the first simulation, and the alternate loss mitigator graphical objects 1142, along with any required animation rules 1141, can be transmitted to one or more of the terminal devices 102,103,104,105 as computer-readable graphic object signals 1143 so that the visualization generated by the system 100 can be rendered on the output of the one or more of the terminal devices 102,103,104,105.

In accordance with the illustrative embodiment of FIG. 11 illustrated and described above, the various entity structures, losses, and loss mitigators used in the visualization systems configured in accordance with embodiments of the disclosure, as well as related systems and methods, solve the technical problem of allowing viewers to intuitively understand complex statistical and probabilistic models representing the adverse impacts of losses of varying magnitudes for a given loss mitigator implementation.

Figure 12:
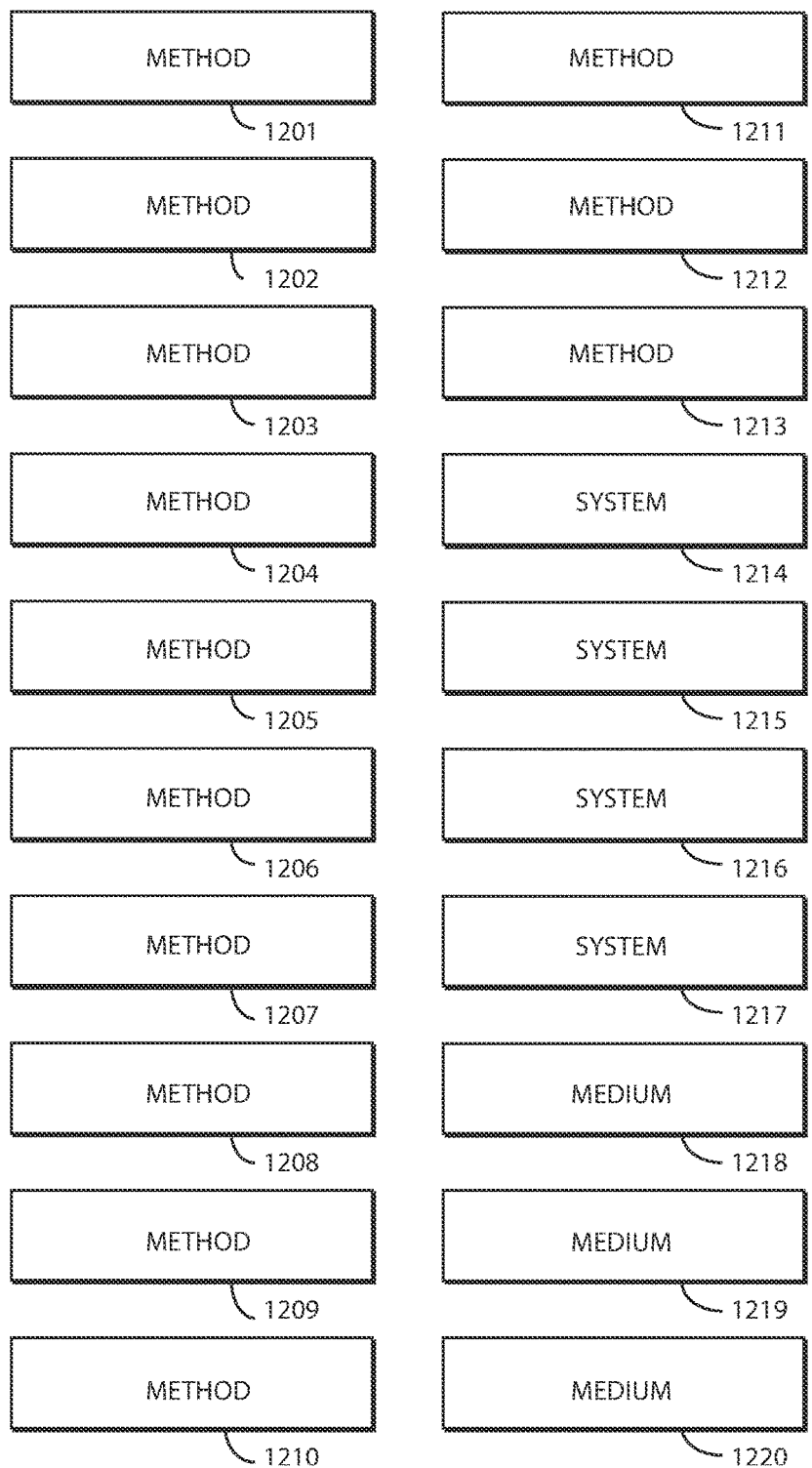
FIG. 12 illustrates various embodiments of the disclosure.

Turning now to FIG. 12, illustrated therein are various embodiments of the disclosure. At 1201, a computer-implemented method for simulating loss effects upon an entity protected by one or more loss mitigators comprises displaying, with one or more processors in a user interface, an entity graphical object, one or more loss graphical objects, each having a loss magnitude associated therewith, and one or more loss mitigator graphical objects. At 1201, the computer-implemented method comprises animating, with the one or more processors in the user interface, the one or more loss graphical objects as a first simulation causing the one or more loss graphical objects to visually interact with one or both of the entity graphical object or the one or more loss mitigator graphical objects in the user interface as a function of a confidence level.

At 1202, the confidence level of 1201 defines a probabilistic threshold that the loss magnitude of all subsequent loss graphical objects interacting with the one or both of the entity graphical object or the one or more loss mitigator graphical objects will be below a predefined loss magnitude threshold.

At 1203, the computer-implemented method of 1202 further comprises displaying, with the one or more processors in the user interface, a confidence level meter identifying the confidence level increasing during the animating. At 1204, the computer-implemented method of 1203 further comprises ceasing the animating when the confidence level meter indicates the confidence level exceeds a predefined threshold.

At 1205, the computer-implemented method of 1205 further comprises accessing, by the one or more processors from an indexed entity data structure, a sample set of loss data. At 1205, the method comprises generating, by the one or more processors, the one or more loss graphical objects from the sample set of loss data.

At 1206, the one or more loss graphical objects of 1205 are defined by a size indicating the loss magnitude. At 1207, the one or more loss graphical objects of 1205 are defined by an opacity indicating a probability that each loss will interact with the one or both of the entity graphical object or the one or more loss mitigator graphical objects. At 1208, the one or more loss graphical objects of 1205 are defined by a color identifying a loss type.

At 1209, the computer-implemented method of 1201 further comprises receiving, by one or more processors via the user interface, one or more inputs defining changes to the one or more loss mitigator graphical objects. At 1210, the computer-implemented method of 1209 further comprises displaying, with one or more processors in the user interface, the entity graphical object, the one or more loss graphical objects, and one or more alternate loss mitigator graphical objects visually representing at least the changes. At 1210, the method comprises animating, with the one or more processors in the user interface, the one or more loss graphical objects as a second simulation causing the one or more loss graphical objects to visually interact with one or both of the entity graphical object or the one or more alternate loss mitigator graphical objects in the user interface as a function of the confidence level.

At 1211, the computer-implemented method of 1210 further comprises displaying, with the one or more processors in the user interface, results of the first simulation and the second simulation simultaneously. At 1212, the computer-implemented method of 1211 further comprises displaying, with the one or more processors in the user interface, both the one or more loss mitigator graphical objects and the one or more alternate loss mitigator graphical objects with the results of the first simulation and the second simulation. At 1213, the results of the first simulation and the second simulation of 1211 each simulating a set of financial losses that can occur to the entity graphical object.

At 1214, a system comprises one or more processors, one or more memory devices operable with the one or more processors and storing one or more computer-executable instructions, and a communication device operable with the one or more processors and in communication with at least one terminal device having a user interface. At 1214, the one or more processors cause display of a visual simulation in the user interface of one or more loss graphical objects interacting with one or both of an entity graphical object or one or more loss mitigator graphical objects as a function of a confidence level defined by a loss probability and a loss magnitude.

At 1215, the confidence level of 1214 defines a probabilistic threshold that only loss graphical objects having a loss magnitude below a predefined magnitude threshold will probabilistically interact with the one or both of the entity graphical object or the one or more loss mitigator graphical objects. At 1216, the one or more processors of 1214 further cause display of another visual simulation in the user interface of the one or more loss graphical objects interacting with one or both of the entity graphical object or one or more alternate loss mitigator graphical objects as a function of the confidence level. At 1217, the one or more processors of 1216 further cause display of a comparison in the user interface, the comparison of a first result of the visual simulation and a second result of the another visual simulation.

At 1218, a non-transitory computer-readable storage medium includes computer-readable instructions to be executed on one or more processors of a system. At 1218, the computer-readable instructions, when executed, cause the one or more processors to display, in a user interface of a terminal device, a first visualization comprising one or more animated loss graphical objects interacting with one or both of an entity graphical object or one or more loss mitigator graphical objects as a function of a confidence level. At 1218, the computer-readable instructions, when executed, cause the one or more processors to display, in the user interface of the terminal device, a second visualization comprising the one or more animated loss graphical objects interacting with one or both of the entity graphical object or one or more alternate loss mitigator graphical objects as a function of the confidence level.

At 1219, the At 1218, the computer-readable instructions of 1218, when executed, cause the one or more processors to display, in the user interface of the terminal device, a comparison of a first result of the first visualization and a second result of the second visualization. At 1220, the confidence level of 1219 defines a probabilistic threshold limiting a loss magnitude of each loss mitigator graphical object interacting with the entity graphical object.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

For example, in one or more embodiments methods described above can be performed by a hardware module that may comprise dedicated circuitry or logic that is permanently configured to perform certain operations. Such a "hardware module" can be considered to encompass a tangible entity, that is physically constructed, permanently configured (hardwired, for example), or temporarily configured (programmed, for example) to operate in a certain manner or to perform certain operations described above.

Alternatively, embodiments of the disclosure may be performed, at least partially, by software, e.g., by one or more processors that are temporarily configured to perform the methods described above. Such processors may constitute processor-implemented modules that operate to perform one or more operations or functions. The performance of certain method steps or system operations may be distributed among the one or more processors in one or more embodiments. The one or more processors may be located within a single machine or at a single geographic location, or alternatively may be distributed across a number of geographic locations.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A computer-implemented method for simulating loss effects upon an entity protected by one or more loss mitigators, the computer-implemented method comprising:
   displaying, with one or more processors in a user interface:
      an entity graphical object;
      one or more loss graphical objects, each having a loss magnitude associated therewith; and
      one or more loss mitigator graphical objects, attached and to extending radially outward from, the entity graphical object; and
   animating, with the one or more processors in the user interface, the one or more loss graphical objects as a first simulation causing the one or more loss graphical objects to visually interact with one or both of the entity graphical object or the one or more loss mitigator graphical objects in the user interface as a function of a confidence level.

2. The computer-implemented method of claim 1, the confidence level defining a probabilistic threshold that the loss magnitude of all subsequent loss graphical objects interacting with the one or both of the entity graphical object or the one or more loss mitigator graphical objects will be below a predefined loss magnitude threshold.

3. The computer-implemented method of claim 2, further comprising displaying, with the one or more processors in the user interface, a confidence level meter identifying the confidence level increasing during the animating.

4. The computer-implemented method of claim 3, further comprising ceasing the animating when the confidence level meter indicates the confidence level exceeds a predefined threshold.

5. The computer-implemented method of claim 1, further comprising:
   accessing, by the one or more processors from an indexed entity data structure, a sample set of loss data; and
   generating, by the one or more processors, the one or more loss graphical objects from the sample set of loss data.

6. The computer-implemented method of claim 5, the one or more loss graphical objects defined by a size indicating the loss magnitude.

7. The computer-implemented method of claim 5, the one or more loss graphical objects defined by an opacity indicating a probability that each loss will interact with the one or both of the entity graphical object or the one or more loss mitigator graphical objects.

8. The computer-implemented method of claim 5, the one or more loss graphical objects defined by a color identifying a loss type.

9. The computer-implemented method of claim 1, further comprising receiving, by the one or more processors via the user interface, one or more inputs defining changes to the one or more loss mitigator graphical objects.

10. The computer-implemented method of claim 9, further comprising:
    displaying, with the one or more processors in the user interface:
       the entity graphical object;
       the one or more loss graphical objects; and
       one or more alternate loss mitigator graphical objects visually representing at least the changes; and
    animating, with the one or more processors in the user interface, the one or more loss graphical objects as a second simulation causing the one or more loss graphical objects to visually interact with one or both of the entity graphical object or the one or more alternate loss mitigator graphical objects in the user interface as the function of the confidence level.

11. The computer-implemented method of claim 10, further comprising displaying, with the one or more processors in the user interface, results of the first simulation and the second simulation simultaneously.

12. The computer-implemented method of claim 11 further comprising displaying, with the one or more processors in the user interface, both the one or more loss mitigator graphical objects and the one or more alternate loss mitigator graphical objects with the results of the first simulation and the second simulation.

13. The computer-implemented method of claim 11, the results of the first simulation and the second simulation each simulating a set of financial losses that can occur to the entity graphical object.

14. A system, comprising:
    one or more processors;
    one or more memory devices operable with the one or more processors and storing one or more computer-executable instructions; and
    a communication device operable with the one or more processors and in communication with at least one terminal device having a user interface;
    the one or more processors causing display of a visual simulation in the user interface of one or more loss graphical objects initially presented in a radial pattern surrounding an entity graphical object and thereafter impacting one or both of the entity graphical object or one or more loss mitigator graphical objects as a function of a confidence level defined by a loss probability and a loss magnitude.

15. The system of claim 14, the confidence level defining a probabilistic threshold that only loss graphical objects having a graphical loss object magnitude below a predefined magnitude threshold will probabilistically interact with the one or both of the entity graphical object or the one or more loss mitigator graphical objects.

16. The system of claim 14, the one or more processors further causing display of another visual simulation in the user interface of the one or more loss graphical objects interacting with one or both of the entity graphical object or one or more alternate loss mitigator graphical objects as the function of the confidence level.

17. The system of claim 16, the one or more processors further causing display of a comparison in the user interface, the comparison of a first result of the visual simulation and a second result of the another visual simulation.

18. A non-transitory computer-readable storage medium including computer-readable instructions to be executed on one or more processors of a system, the computer-readable instructions, when executed, causing the one or more processors to:

display, in a user interface of a terminal device, a first visualization comprising one or more animated loss graphical objects impacting, as a function of a confidence level, one or both of a cylindrical entity graphical object or one or more loss mitigator graphical objects extending radially from an exterior of the cylindrical entity graphical object; and display, in the user interface of the terminal device, a second visualization comprising the one or more animated loss graphical objects impacting, as the function of the confidence level, one or both of the cylindrical entity graphical object or one or more alternate loss mitigator graphical objects extending radially from the exterior of the cylindrical entity graphical object.

19. The non-transitory computer-readable storage medium of claim 18, the computer-readable instructions, when executed, further causing the one or more processors to display, in the user interface of the terminal device, a comparison of a first result of the first visualization and a second result of the second visualization.

20. The non-transitory computer-readable storage medium of claim 19, the confidence level defining a probabilistic threshold limiting a loss magnitude of each loss mitigator graphical object interacting with the cylindrical entity graphical object.

* * * * *